(12) United States Patent
Makiyama

(10) Patent No.: US 7,957,877 B2
(45) Date of Patent: Jun. 7, 2011

(54) CURVING TENDENCY DETECTION DEVICE IN VEHICLE, AND VEHICLE RESPONSE CONTROL APPARATUS USING SAME

(75) Inventor: Akihiro Makiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1099 days.

(21) Appl. No.: 11/684,838

(22) Filed: Mar. 12, 2007

(65) Prior Publication Data
US 2007/0219700 A1 Sep. 20, 2007

(30) Foreign Application Priority Data
Mar. 15, 2006 (JP) ................................. 2006-071354

(51) Int. Cl.
*B60T 8/24* (2006.01)
*G06G 1/00* (2006.01)

(52) U.S. Cl. ............. 701/72; 701/70; 180/197; 303/146

(58) Field of Classification Search ............... 701/41, 701/70, 72, 78, 82–83, 79; 303/140, 146; 180/197
See application file for complete search history.

(56) References Cited

U.S. PATENT DOCUMENTS

| | | | |
|---|---|---|---|
| 5,054,813 A | | 10/1991 | Kakizaki |
| 5,172,961 A | * | 12/1992 | Inoue et al. ............... 303/146 |
| 5,265,472 A | | 11/1993 | Pfeifle et al. |
| 5,519,611 A | | 5/1996 | Tagawa et al. |
| 5,627,756 A | * | 5/1997 | Fukada et al. ............ 701/70 |
| 5,668,724 A | * | 9/1997 | Ehret et al. ............... 701/80 |
| 5,671,143 A | * | 9/1997 | Graber ..................... 701/72 |
| 5,694,321 A | * | 12/1997 | Eckert et al. .............. 701/91 |
| 5,701,248 A | * | 12/1997 | Wanke ..................... 701/70 |
| 5,710,704 A | * | 1/1998 | Graber ..................... 701/82 |

(Continued)

FOREIGN PATENT DOCUMENTS

DE 3943007 A1 7/1990

(Continued)

OTHER PUBLICATIONS

Novel vehicle detection system based on line scan camera; Zhigang Xu; Xiangmo Zhao; Na Li; Electronic Measurement & Instruments, 2009. ICEMI '09. 9th International Conference on; Digital Object Identifier: 10.1109/ICEMI.2009.5274703 Publication Year: 2009 , pp. 1-748-1-751.*

(Continued)

*Primary Examiner* — Cuong H Nguyen
(74) *Attorney, Agent, or Firm* — Global IP Counselors, LLP

(57) ABSTRACT

A curving tendency detection device is provided to detecting a curving tendency (curving frequency and amount of curvature) in a vehicle roadway or a vehicle running state (behavior). Basically, the curving tendency detection device has a lateral acceleration differential value calculation section and a curving tendency estimation section. The lateral acceleration differential value calculation section calculates vehicle lateral acceleration differential values of a vehicle lateral acceleration acting on a vehicle as the vehicle lateral acceleration varies over time. The curving tendency estimation section estimates the curving tendency based on the vehicle lateral acceleration differential value calculated by the lateral acceleration differential value calculation section. Thus, the curving can be reliably detected by effectively avoiding a false curving tendency in cases in which the left and right wheels have different effective diameters, or the vehicle is driving straight along a laterally tilted road.

15 Claims, 22 Drawing Sheets

U.S. PATENT DOCUMENTS

| | | | | |
|---|---|---|---|---|
| 5,710,705 | A * | 1/1998 | Eckert | 701/83 |
| 5,711,023 | A * | 1/1998 | Eckert et al. | 701/70 |
| 5,711,024 | A * | 1/1998 | Wanke | 701/82 |
| 5,711,025 | A * | 1/1998 | Eckert et al. | 701/83 |
| 5,735,584 | A * | 4/1998 | Eckert | 303/140 |
| 5,748,476 | A | 5/1998 | Sekine et al. | |
| 5,774,821 | A * | 6/1998 | Eckert | 701/78 |
| 5,862,503 | A * | 1/1999 | Eckert et al. | 701/78 |
| 5,948,028 | A * | 9/1999 | Raad et al. | 701/37 |
| 6,158,746 | A * | 12/2000 | Uchiyama et al. | 280/5.503 |
| 6,259,973 | B1 * | 7/2001 | Ehret et al. | 701/1 |
| 6,289,272 | B1 * | 9/2001 | Batistic et al. | 701/72 |
| 6,611,747 | B1 * | 8/2003 | Schmitt et al. | 701/84 |
| 6,625,527 | B1 * | 9/2003 | Ding et al. | 701/34 |
| 6,957,873 | B2 * | 10/2005 | Wanke et al. | 303/140 |
| 7,681,960 | B2 * | 3/2010 | Wanke et al. | 303/146 |
| 2004/0046447 | A1 * | 3/2004 | Wanke et al. | 303/140 |
| 2004/0130210 | A1 * | 7/2004 | Wanke et al. | 303/191 |
| 2005/0004738 | A1 * | 1/2005 | Gronau et al. | 701/70 |
| 2006/0204347 | A1 * | 9/2006 | Waldbauer et al. | 410/156 |
| 2007/0219700 | A1 * | 9/2007 | Makiyama | 701/72 |

FOREIGN PATENT DOCUMENTS

| | | | |
|---|---|---|---|
| DE | 4221059 A1 | | 1/1993 |
| DE | 195 15 048.1 | * | 4/1995 |
| DE | 19543551 A1 | | 5/1996 |
| DE | 19615311 A1 | | 10/1997 |
| DE | 101 30 663.6 | * | 4/2001 |
| JP | 03-068870 A | | 3/1991 |
| JP | 403129161 A | * | 6/1991 |
| JP | 06-156035 | | 6/1994 |
| JP | 6-195912 | * | 7/1994 |
| JP | 07-215193 | | 8/1995 |
| JP | H08-48257 | | 2/1996 |
| JP | 11-194087 | | 7/1999 |
| JP | 11268647 A | * | 10/1999 |
| JP | 11-311325 | | 11/1999 |
| JP | 2000-272489 | | 10/2000 |
| JP | 2004-347032 | | 12/2004 |
| JP | 2005-125894 A | | 5/2005 |
| JP | 2007-139052 A | | 6/2007 |
| WO | WO98/03382 | * | 1/1998 |
| WO | WO 9937520 A1 | * | 7/1999 |
| WO | WO00/48883 | * | 8/2000 |
| WO | WO 0189904 A1 | * | 11/2001 |
| WO | PCT/EP02/03530 | * | 3/2002 |
| WO | WO02/36401 | * | 5/2002 |

OTHER PUBLICATIONS

Automatic detection technique of preceding lane and vehicle; Banggui Zheng; Bingxiang Tian; Jianmin Duan; Dezhi Gao; Automation and Logistics, 2008. ICAL 2008. IEEE International Conference on; Digital Object Identifier:; 10.1109/ICAL.2008.4636367; Publication Year: 2008 , pp. 1370-1375.*

Virtual Mid-Line Detection on Curve Road for User Guidance Using Simulation Model; Faizal, E.R.M.; Mansor, H.M.A.H.; Computer Technology and Development, 2009. ICCTD '09. International Conference on; vol. 1; Digital Object Identifier: 10.1109/ICCTD.2009. 210; Publication Year: 2009 , pp. 24-27.*

Analysis of Vehicle Handling and Stability in Frequency Domain Based on System Identification Method; Wu Changshui; Yuan Ming; Gong Yuanming; Qian Yu Bin; Information Engineering (ICIE), 2010 WASE International Conference on; vol. 3 Digital Object Identifier: 10.1109/ICIE.2010.264; Publication Year: 2010 , pp. 365-368.*

Estimation of Tire-Road Friction Coefficient Using a Novel Wireless Piezoelectric Tire Sensor; Erdogan, G.; Alexander, L.; Rajamani, R.; Sensors Journal, IEEE; vol. 11 , Issue: 2; Digital Object Identifier: 10.1109/JSEN.2010.2053198 Publication Year: 2011 , pp. 267-279.*

Integrated Driver-Vehicle-Infrastructure Road Departure Warning Unit; Glaser, S.; Mammar, S.; Sentouh, C.; Vehicular Technology, IEEE Transactions on; vol. 59 , Issue: 6; Digital Object Identifier: 10.1109/TVT.2010.2049670 Publication Year: 2010 , pp. 2757-2771.*

A calculation algorithm of the road shape based on accelerometer and laser displacement sensor; Han Yi; Yang Diange; Lian Xiaomin; Mechanic Automation and Control Engineering (MACE), 2010 International Conference on; Digital Object Identifier: 10.1109/ MACE.2010.5535621; Publication Year: 2010 , pp. 2358-2361.*

Vehicle lateral and longitudinal velocity estimation based on Unscented Kalman Filter; Liang Chu; Yongsheng Zhang; Yanru Shi; Mingfa Xu; Minghui Liu; Education Technology and Computer (ICETC), 2010 2nd International Conference on ; vol. 3 Digital Object Identifier: 10.1109/ICETC.2010.5529507; Publication Year: 2010 , pp. V3-427-V3-432.*

Reliable method for driving events recognition; Mitrovic, D.; Intelligent Transportation Systems, IEEE Transactions on vol. 6, Issue: 2; Digital Object Identifier: 10.1109/TITS.2005.848367; Publication Year: 2005 , pp. 198-205.*

Robust bank angle estimation for rolling stability control on electric vehicle; Kawashima, K.; Hori, Y.; Uchida, T.; Sehoon Oh; Advanced Motion Control, 2010 11th IEEE International Workshop on; Digital Object Identifier: 10.1109/AMC.2010.5464087 Publication Year: 2010 , pp. 448-453.*

Long-term vehicle motion prediction; Hermes, C.; Wohler, C.; Schenk, K.; Kummert, F.; Intelligent Vehicles Symposium, 2009 IEEE ; Digital Object Identifier: 10.1109/IVS.2009.5164354; Publication Year: 2009 , pp. 652-657.*

An English translation of the Japanese Office Action of corresponding Japanese Application No. 2006-071354, dated Aug. 17, 2010.

* cited by examiner

Gy: LATERAL ACCELERATION
Vw: MEAN WHEEL SPEED
VR: RIGHT WHEEL SPEED
VL: LEFT WHEEL SPEED
R: TURNING RADIUS
W: LEFT AND RIGHT INTER-WHEEL TREAD

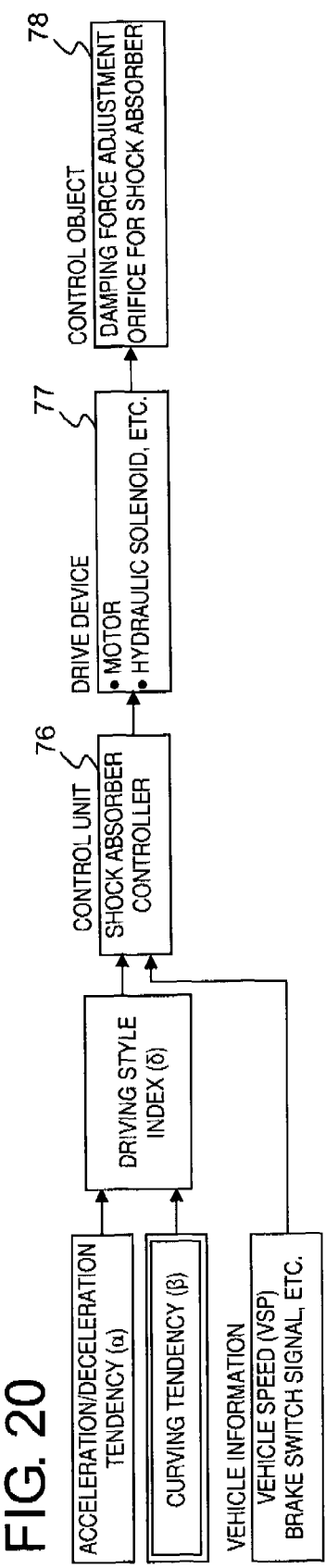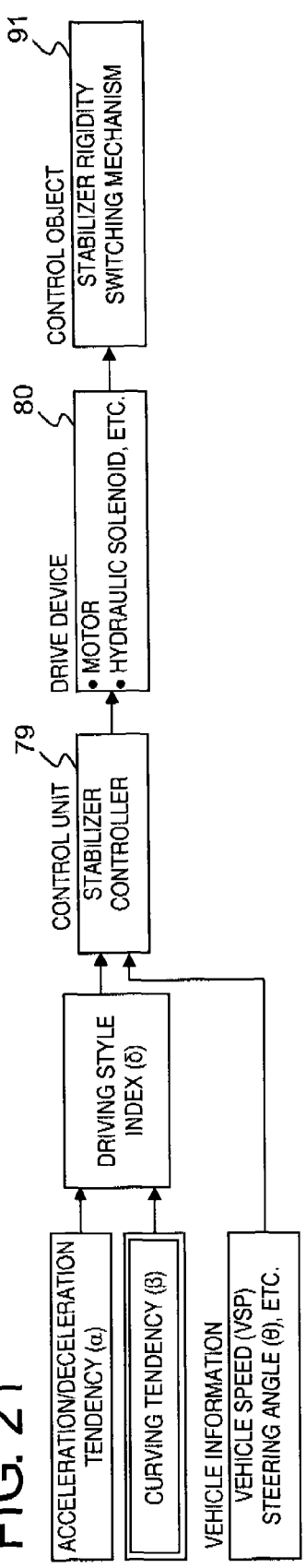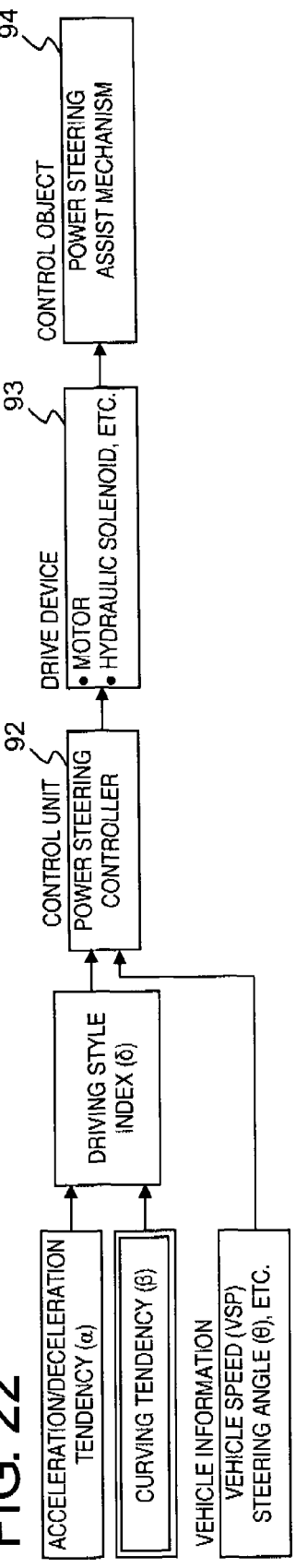

CURVING TENDENCY DETECTION DEVICE IN VEHICLE, AND VEHICLE RESPONSE CONTROL APPARATUS USING SAME

CROSS-REFERENCE TO RELATED APPLICATIONS

This application claims priority to Japanese Patent Application No. 2006-071354, filed on Mar. 15, 2006. The entire disclosure of Japanese Patent Application No. 2006-071354 is hereby incorporated herein by reference.

BACKGROUND OF THE INVENTION

1. Field of the Invention

The present invention generally relates to an apparatus for detecting the curve frequency, degree of curvature, and other curving tendency factors of a vehicle roadway or the running state of a vehicle. The present invention also generally relates to an apparatus for appropriately controlling an action response in a vehicle by using a curving tendency detected by the curving tendency detection device.

2. Background Information

One example of an apparatus for detecting a curving tendency in a vehicle roadway that has been proposed in the past is the apparatus disclosed in Japanese Laid-Open Patent Application No. 11-311325. This curving tendency detection device is used to control gear shifting in an automatic transmission. This apparatus detects a curving tendency based on the lateral acceleration acting on the vehicle in the width direction, and detects that the vehicle is cornering.

Japanese Laid-Open Patent Application No. 11-311325 also discloses a technique for improving a running performance of a vehicle during cornering. In particular, the automatic transmission is prevented from upshifting and the automatic transmission tends to select a lower transmission gear ratio while cornering is detected.

In view of the above, it will be apparent to those skilled in the art from this disclosure that there exists a need for an improved curving tendency detection device. This invention addresses this need in the art as well as other needs, which will become apparent to those skilled in the art from this disclosure.

SUMMARY OF THE INVENTION

It has been discovered that in the conventional technology several problems occur when a curving tendency in a vehicle roadway is detected from the lateral acceleration acting on the vehicle. Lateral acceleration can be determined in several different ways, such as by using a lateral acceleration sensor (that senses gravity in the lateral direction) or a wheel speed difference between left and right wheels of the vehicle.

One problem with using a lateral acceleration sensor is that when the vehicle is inclined due to a slope in the road, the lateral acceleration is sensed even when the vehicle is traveling straight. In other words, using a lateral acceleration sensor creates problems in which lateral acceleration is mistakenly sensed when the vehicle is traveling straight. Another problem is that in cases in which lateral acceleration is sensed from the wheel speeds, the lateral acceleration is sensed even if the vehicle is traveling straight when the left and right tires have different diameters. This occurs because a left and right wheel speed difference is outputted. For example, the lateral acceleration in the vehicle occurs not only as a result of cornering, but also as a result of differences in tire wear or air pressure between the left and right wheels. Also the lateral acceleration in the vehicle can occur as a result of one of the left or right wheels going flat, which causes the left and right tires to have different effective diameters and the vehicle to tilt. In other words, using the wheel speeds to sense the lateral acceleration can also result in the lateral acceleration being mistakenly sensed when the vehicle is traveling straight.

Therefore, when a curving tendency in the vehicle roadway is detected from the lateral acceleration of the vehicle as in conventional practice, problems are encountered in that lateral acceleration resulting from using a lateral acceleration sensor or the wheel speeds is mistakenly determined to indicate a curving tendency in the vehicle roadway.

One object of the present invention is to provide a curving tendency detection device for detecting a curving tendency in a vehicle wherein a curving tendency is detected not just based on the vehicle lateral acceleration, but based on a vehicle lateral acceleration differential value, which is the rate at which this vehicle lateral acceleration varies over time.

Another object of the present invention is a false curving tendency determination that can occur due to such factors as the left and right wheels having different effective diameters, or the vehicle driving straight along a laterally tilted (sloped) road, or the weight distribution in the vehicle, or the like.

In accordance with one aspect of the present invention a curving tendency detection device is provided that basically comprises a lateral acceleration differential value calculation section and a curving tendency estimation section. The lateral acceleration differential value calculation section is configured to calculate a lateral acceleration differential value of a lateral acceleration acting on a vehicle as the lateral acceleration varies over time. The curving tendency estimation section is configured to estimate a curving tendency of at least one of a vehicle roadway and a running state of the vehicle, with the curving tendency being estimated based on the lateral acceleration differential value calculated by the lateral acceleration differential value calculation section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 20 is a functional block diagram showing a case in which the driving style determination apparatus shown in FIG. 1 is used to control the damping force of a shock absorber;

FIG. 21 is a functional block diagram showing a case in which the driving style determination apparatus shown in FIG. 1 is used to control the rigidity of a stabilizer;

FIG. 22 is a functional block diagram showing a case in which the driving style determination apparatus shown in FIG. 1 is used to control the assist force in power steering;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
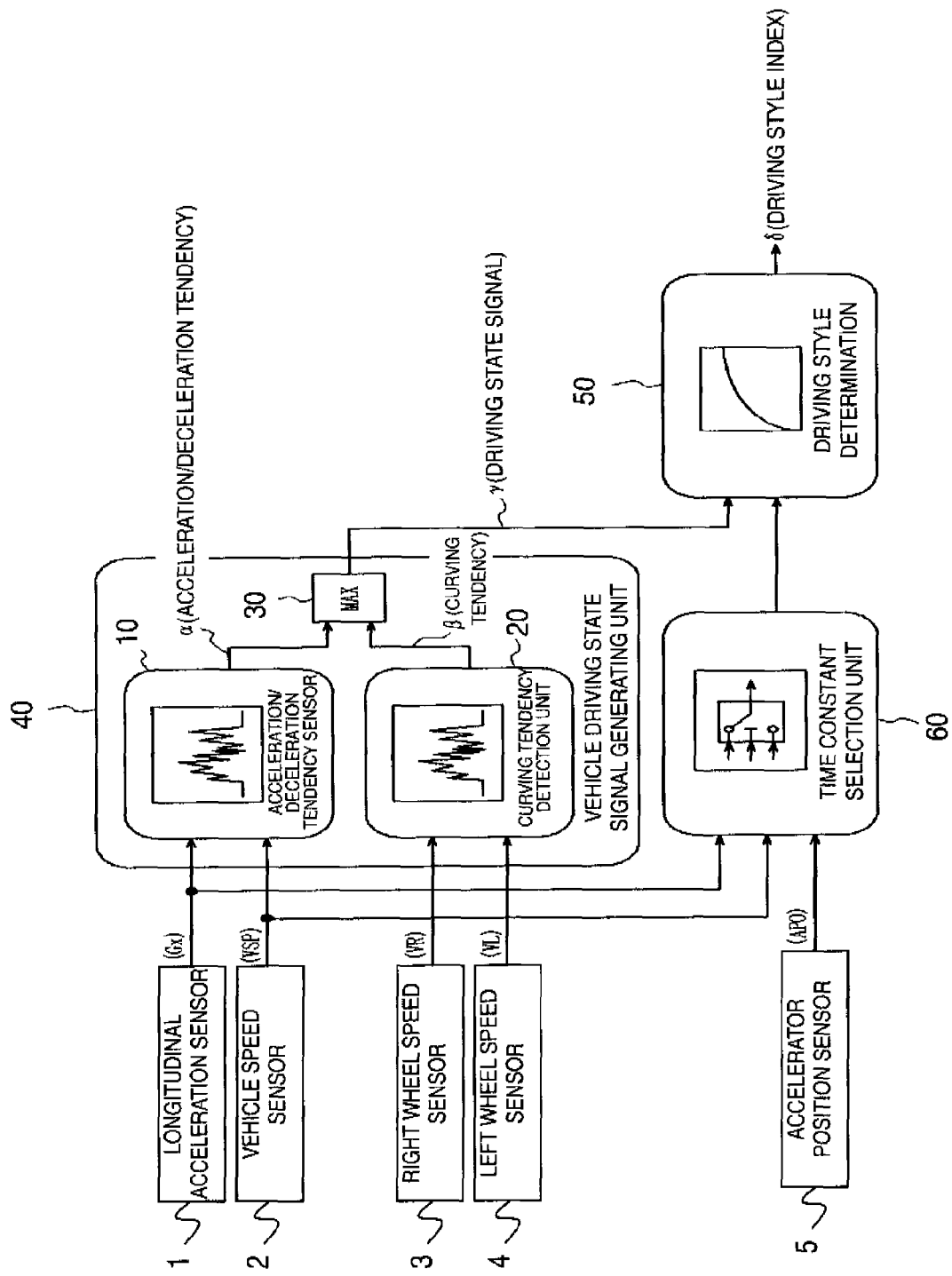
FIG. 1 is a schematic block diagram of a vehicle driving style determination apparatus equipped with a road curving tendency detection device in accordance with to one embodiment of the present invention.
Figure 2:
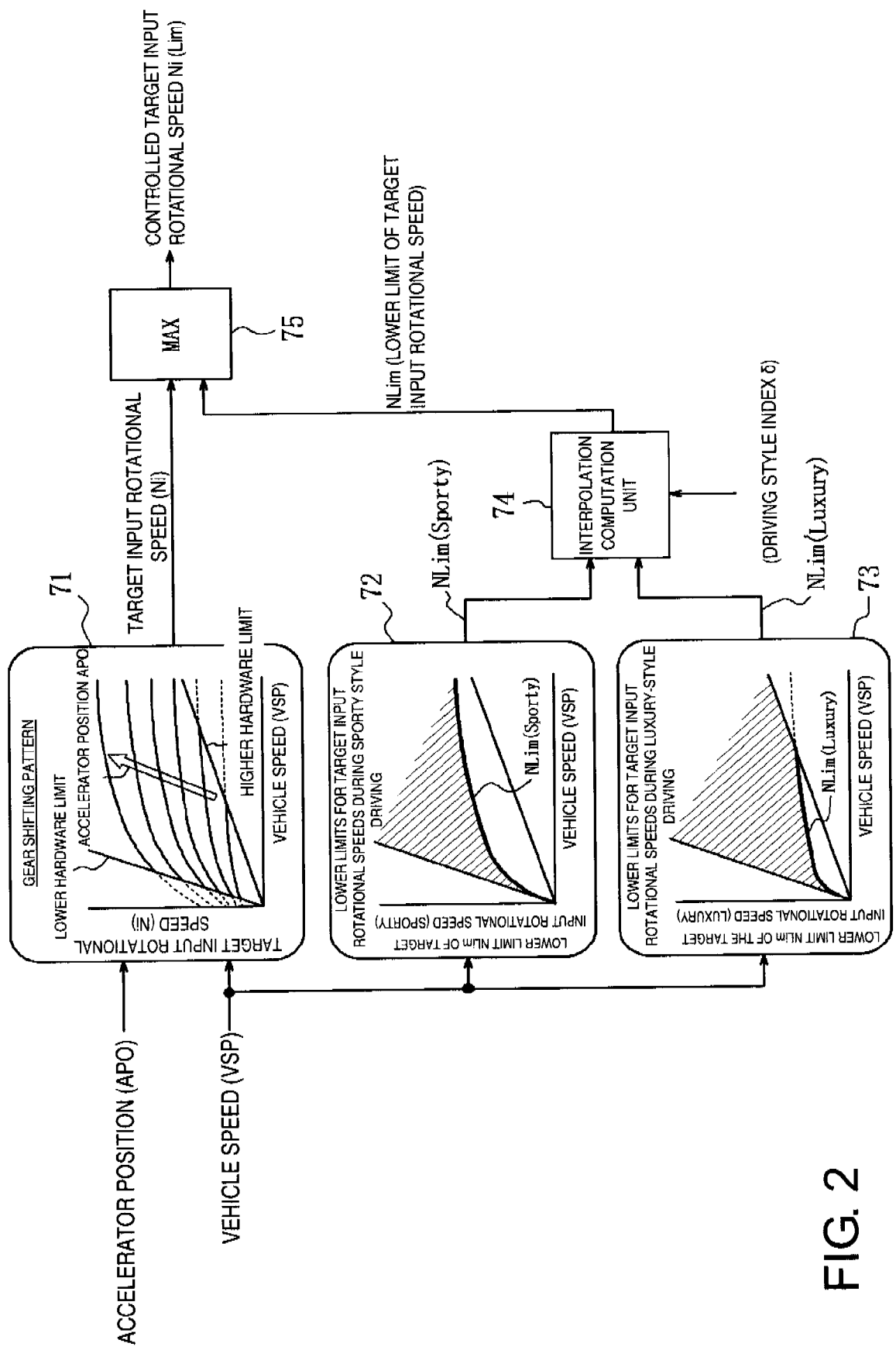
FIG. 2 is a block diagram showing a gearshift control apparatus for a continuously variable transmission that uses the determination results obtained by the driving style determination apparatus shown in FIG. 1.

Referring initially to FIG. 1, a vehicle driving style determination apparatus is schematically illustrated in accordance with a first embodiment of the present invention. The vehicle driving style determination apparatus is configured to determine a driving style of a vehicle such as a sporty driving style or a luxury driving style. The vehicle driving style determination apparatus basically comprises a road curving tendency detection device according to the first embodiment of the present invention. FIG. 2 shows a gearshift control system (one embodiment of a vehicle response control device according to the present invention) of a continuously variable transmission that uses the determination results of the vehicle driving style determination apparatus in FIG. 1.

First, the vehicle driving style determination apparatus is described with reference to FIG. 1. The vehicle driving style determination apparatus is operatively connected to a longitudinal acceleration sensor 1, a vehicle speed sensor 2, a right wheel speed sensor 3, a left wheel speed sensor 4 and a signal from an accelerator position sensor 5. The longitudinal acceleration sensor 1 is configured and arranged to detect the longitudinal acceleration Gx of the vehicle and output a signal indicative of the longitudinal acceleration Gx of the vehicle to the vehicle driving style determination apparatus. The vehicle speed sensor 2 is configured and arranged to detect the vehicle speed VSP of the vehicle and output a signal indicative of the vehicle speed VSP of the vehicle to the vehicle driving style determination apparatus. The a right wheel speed sensor 3 is configured and arranged to detect the right wheel speed VR of the vehicle and output a signal indicative of the right wheel speed VR of the vehicle to the vehicle driving style determination apparatus. The left wheel speed sensor 4 is configured and arranged to detect the left wheel speed VL of the vehicle and output a signal indicative of the left wheel speed VL of the vehicle to the vehicle driving style determination apparatus. The accelerator position sensor 5 is configured and arranged to detect the accelerator pedal depression amount (accelerator position) APO of the accelerator pedal of the vehicle and output a signal indicative of the accelerator pedal depression amount (accelerator position) APO of the vehicle to the vehicle driving style determination apparatus. Thus, the vehicle driving style determination apparatus receives inputs from each of the sensors 1 to 5.

The vehicle driving style determination apparatus then determines the vehicle driving style (sporty driving style or luxury driving style) of the driver in the following manner.

As seen in FIG. 1, the vehicle driving style determination apparatus includes an acceleration/deceleration tendency sensor 10, a curving tendency detection unit 20 and a select-high switch 30 that cooperate together to constitute a vehicle driving state signal generating unit 40. The acceleration/deceleration tendency sensor 10 is configured and arranged to detect a tendency of the driver to accelerate and decelerate the vehicle based on the signals from the longitudinal acceleration sensor 1 and the vehicle speed sensor 2. The curving tendency detection unit 20 is equivalent to the curving tendency detection device of the present invention. The curving tendency detection unit 20 is configured and arranged to detect a curving tendency of the vehicle based on based on the signals from the right and left wheel speed sensors 3 and 4. Thus, the lateral acceleration of the vehicle can be determined from the signals of the right and left wheel speed sensors 3 and 4 as explained below.

Of course, it will be apparent to those skilled in the art from this disclosure that the right and left wheel speed sensors 3 and 4 can be replaced with other sensor(s) and/or detection device(s) to produce one or more signals that can be used to indicate lateral acceleration for determining that the vehicle has a curving tendency. For example, the lateral acceleration of the vehicle can be detected with a lateral acceleration sensor (that senses gravity in the lateral direction) or the like. Thus, it will be apparent to those skilled in the art from this disclosure that the lateral acceleration of the vehicle can be sensed with other methods and is not limited to the illustrated embodiment of the right and left wheel speed sensors 3 and 4.

The select-high switch 30 is configured and arranged to receive an acceleration/deceleration tendency signal $\alpha$ from the acceleration/deceleration tendency sensor 10 and a curving tendency signal $\beta$ from the curving tendency detection unit 20. The select-high switch 30 is further configured and arranged to select the greater of the acceleration/deceleration tendency signal $\alpha$ from the acceleration/deceleration tendency sensor 10 and the curving tendency signal $\beta$ from the curving tendency detection unit 20 and then convert the selected signal to a driving state signal $\gamma$.

As seen in FIG. 1, the vehicle driving style determination apparatus further includes a driving style determination unit 50 and a time constant selection unit 60. The driving style determination unit 50 is configured and arranged to filter the driving state signal $\gamma$ from the vehicle driving state signal generating unit 40 and then determine the driving style based on the average output level of the driving state signal $\gamma$. The time constant selection unit 60 is configured and arranged to select a time constant to be used in the filtering of the determination unit 50 based on the signals from the longitudinal acceleration sensor 1, the vehicle speed sensor 2 and the accelerator position sensor 5.

Figure 3:
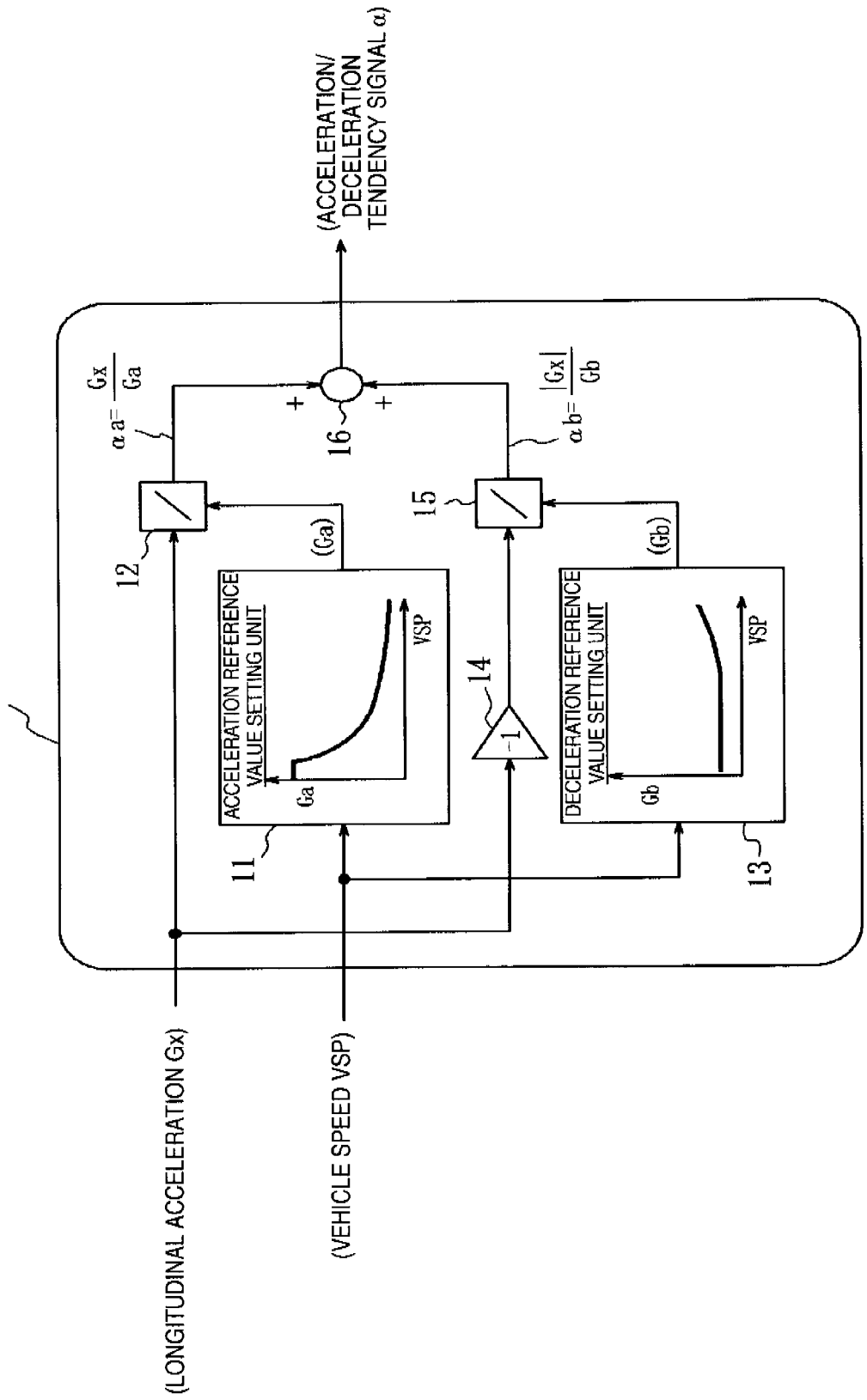
FIG. 3 is a schematic block diagram showing the details of the acceleration/deceleration tendency detection unit in FIG. 1.

The acceleration/deceleration tendency sensor 10 is shown in more detail in FIG. 3. The acceleration/deceleration tendency sensor 10 includes an acceleration reference value setting unit 11, a divider 12, a deceleration reference value setting unit 13, a polarity reverser 14, a divider 15 and an adder 16. This acceleration/deceleration tendency sensor 10 detects the acceleration rate of the vehicle based on the longitudinal acceleration Gx and the vehicle speed VSP, and calculates the acceleration/deceleration tendency signal $\alpha$ as follows. When the longitudinal acceleration Gx indicates acceleration (i.e., Gx is positive), an acceleration reference value setting unit 11 sets the maximum possible acceleration of the vehicle in view of the vehicle speed VSP as an acceleration reference value based on a prepared map.

Next, the divider 12 divides the longitudinal acceleration Gx by the acceleration reference value Ga to calculate a normalized acceleration value $\alpha a=Gx/Ga$, which is obtained by normalizing (converting to a 0-1 signal) the extent to which the current longitudinal acceleration Gx relates to the maximum acceleration (acceleration reference value) Ga.

When the longitudinal acceleration Gx indicates deceleration (i.e., Gx is negative), the deceleration reference value setting unit 13 sets the maximum possible deceleration of the vehicle in view of the vehicle speed VSP as a deceleration reference value Gb based on a prepared map.

Next, the polarity reverser 14 reverses the polarity in order to match the polarity of the deceleration Gx, and the divider 15 divides the reversed-polarity value of the deceleration Gx by the deceleration reference value Gb to calculate a normalized deceleration value $\alpha b=|Gx|/Gb$, which is obtained by normalizing (converting to a 0-1 signal) the extent to which the current deceleration Gx relates to the maximum deceleration (deceleration reference value) Gb.

The adder 16 adds the normalized deceleration value $\alpha b$ to the normalized acceleration value $\alpha a$, and the sum of these values is supplied as a normalized acceleration/deceleration tendency signal $\alpha=\alpha a+\alpha b$ to the select-high switch 30 in FIG. 1.

Figure 4:
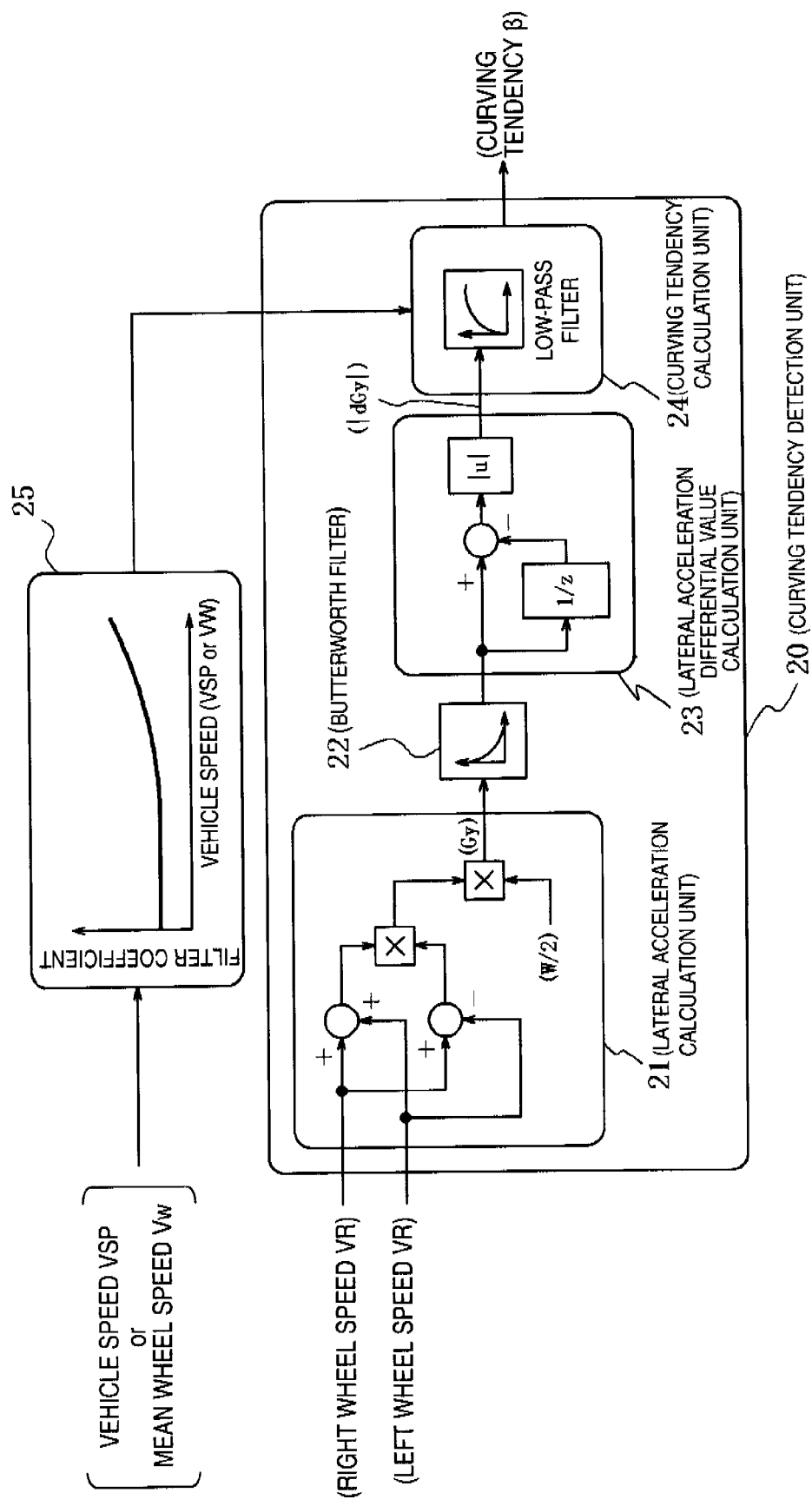
FIG. 4 is a schematic block diagram showing the details of the curving tendency detection unit in FIG. 1.

The curving tendency detection unit 20 in FIG. 1 is equivalent to the curving tendency detection device of the present invention. As seen in FIG. 4, the curving tendency detection unit 20 include a lateral acceleration calculation unit 21, a Butterworth filter 22, a lateral acceleration differential value calculation unit 23, and a curving tendency calculation unit 24 (a low-pass filter). Also the curving tendency detection unit 20 is provided with a filter coefficient setting unit 25 that is configured to set the filter coefficient of the low-pass filter of curving tendency calculation unit 24 based on the vehicle speed VSP or the mean wheel speed Vw, as shown in FIG. 4.

Figure 5:
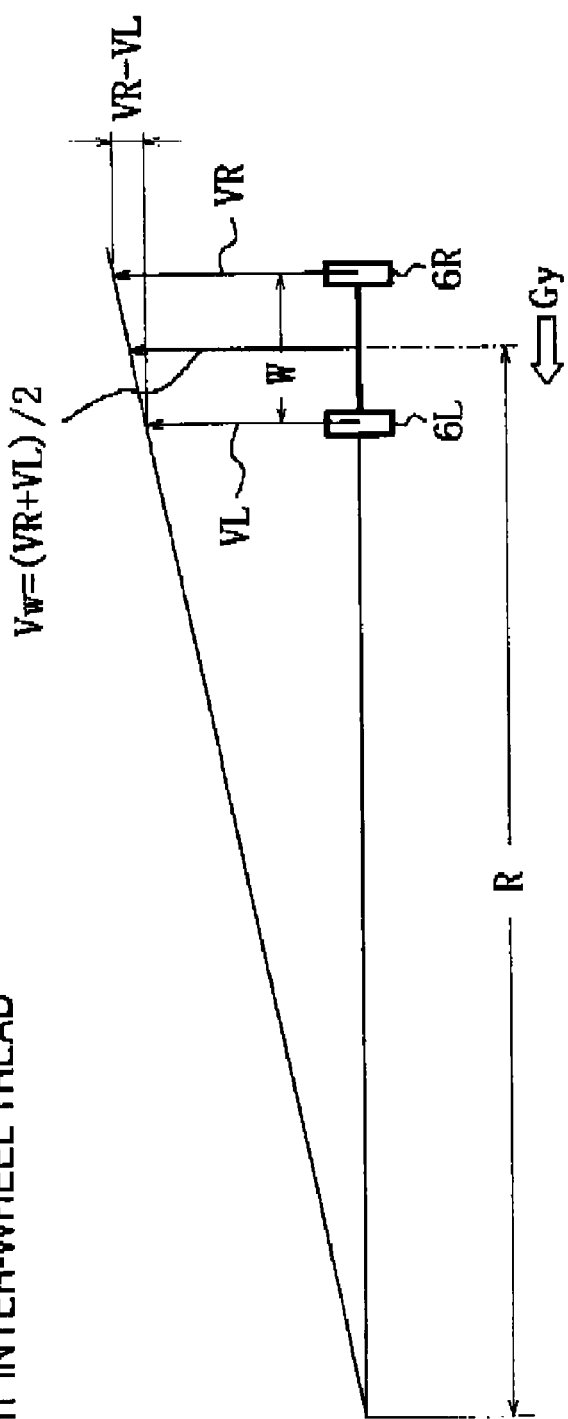
FIG. 5 is a diagram describing the principle used to determine the formula for calculating the lateral acceleration of the vehicle.

The lateral acceleration calculation unit 21 is configured to calculate the lateral acceleration Gy acting on the vehicle based on the right wheel speed VR and left wheel speed VL and based on the theory described below with respect to FIG. 5.

As relates to the theory described with reference to FIG. 5, the symbols 6L in the diagram denote the left wheels and the symbols 6R denote the right wheels.

The mean wheel speed Vw of the right wheel speed VR and left wheel speed VL is expressed as Vw=(VR+VL)/2, which is multiplied by the vehicle turning radius R to obtain a value that is equal to the value obtained by dividing the difference (VR−VL) between the right wheel speed VR and left wheel speed VL by the left and right inter-wheel tread W, shown below.

$$\{(VR+VL)/2\}R=(VR-VL)/W$$

The following formula is obtained from this formula.

$$\{(VR+VL)/(VR-VL)\}W/2=R$$

The lateral acceleration Gy will be Gy=Vw×2/R, and the lateral acceleration Gy can therefore be expressed as follows.

$$Gy = Vw \times 2/R$$
$$= (VR - VL) \cdot (VR + VL) \cdot (1/2)W$$

Based on the right wheel speed VR, the left wheel speed VL, and the left and right inter-wheel tread W, the lateral acceleration calculation unit 21 calculates the lateral acceleration Gy by using the above formulas, as indicated in FIG. 4. It is economically efficient to determine the lateral acceleration Gy through calculation in this manner. However, it will also be apparent from this disclosure that the lateral acceleration can also be directly detected by a lateral acceleration sensor.

The lateral acceleration Gy determined by this calculation is passed through the Butterworth filter 22, thereby removing lateral acceleration calculation errors included in the calculated value of the lateral acceleration Gy as a result of differences in the left and right wheel speeds caused by uneven terrain or the like, as will be described later.

The lateral acceleration differential value calculation unit 23 of FIG. 4 thus calculates a lateral acceleration differential value dGy, which is the time variation rate of the filtered value of the lateral acceleration (Gy) that has been passed through the Butterworth filter 22, and then outputs an absolute value |dGy|.

Therefore, the lateral acceleration differential value calculation unit 23 is equivalent to the lateral acceleration differential value calculation section of the present invention.

The lateral acceleration differential value |dGy| is then passed through the curving tendency calculation unit 24 to determine the curving tendency β of the vehicle roadway.

Figure 6:
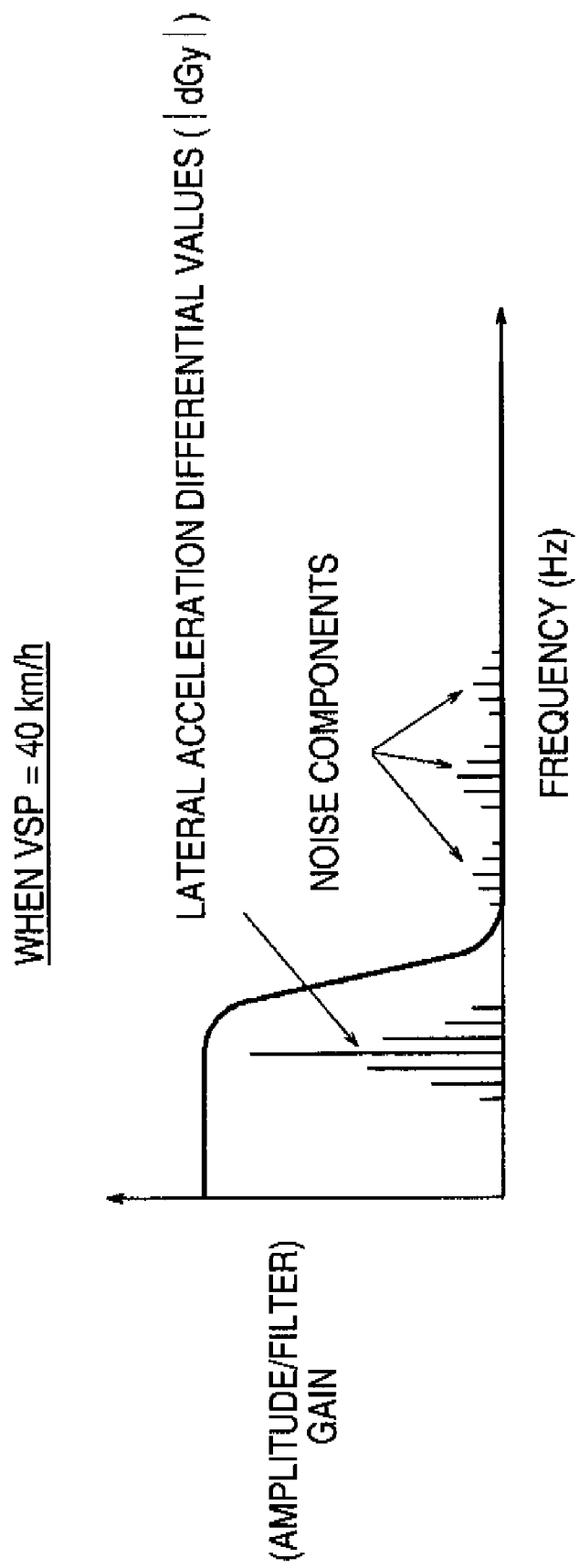
FIG. 6 is a line characteristics diagram showing the filter gain characteristics of the low-pass filter constituting the curving tendency calculation unit in FIG. 4.

A case in which the vehicle speed VSP is 40 km/h will now be described. The curving tendency calculation unit 24 is a low-pass filter in which the amplitude gain has high filter gain characteristics in a low frequency range, as shown in FIG. 6. This low-pass filter has a first-order delay element and sets the time constant high in order to detect a curving tendency in the vehicle roadway over long periods of time.

The curving tendency calculation unit 24 extracts lateral acceleration differential values |dGy| for effective frequency ranges that differ according to the vehicle's running state, and removes noise components from other frequency ranges. The curving tendency calculation unit 24 then calculates the curving tendency β of the vehicle roadway, which is normalized to a numerical value 0 or 1 in the same manner as above, based on the mean output level of the lateral acceleration differential values |dGy| that have been extracted after passing through the low-pass filter.

Therefore, the curving tendency calculation unit 24 is equivalent to the curving tendency estimation section of the present invention.

The effective frequency ranges of the lateral acceleration differential values |dGy| that are to be extracted in this manner differ according to the vehicle speed VSP and other running state parameters. When the vehicle speed VSP is 40 km/h, the lateral acceleration differential values |dGy| are generated in a low frequency range, as shown by the dotted lines (the same as in FIG. 6) in diagrams (a) and (b) of FIG. 7. When the vehicle speed VSP is 80 km/h, the lateral acceleration differential values |dGy| are generated in a high frequency range, as shown by the solid lines in diagrams (a) and (b) of FIG. 7. The effective frequency range of the lateral acceleration differential values |dGy| is higher at higher vehicle speeds VSP.

In view of these facts, the filter coefficient setting unit 25 is provided as shown in FIG. 4, and the filter coefficient of the low-pass filter that constitutes the curving tendency calculation unit 24 is controlled in accordance with the vehicle speed VSP (or the mean wheel speed Vw described in FIG. 5), so as to achieve filter gain characteristics that make it possible to extract lateral acceleration differential values |dGy| in frequency ranges that become higher with higher vehicle speeds.

Figure 7:
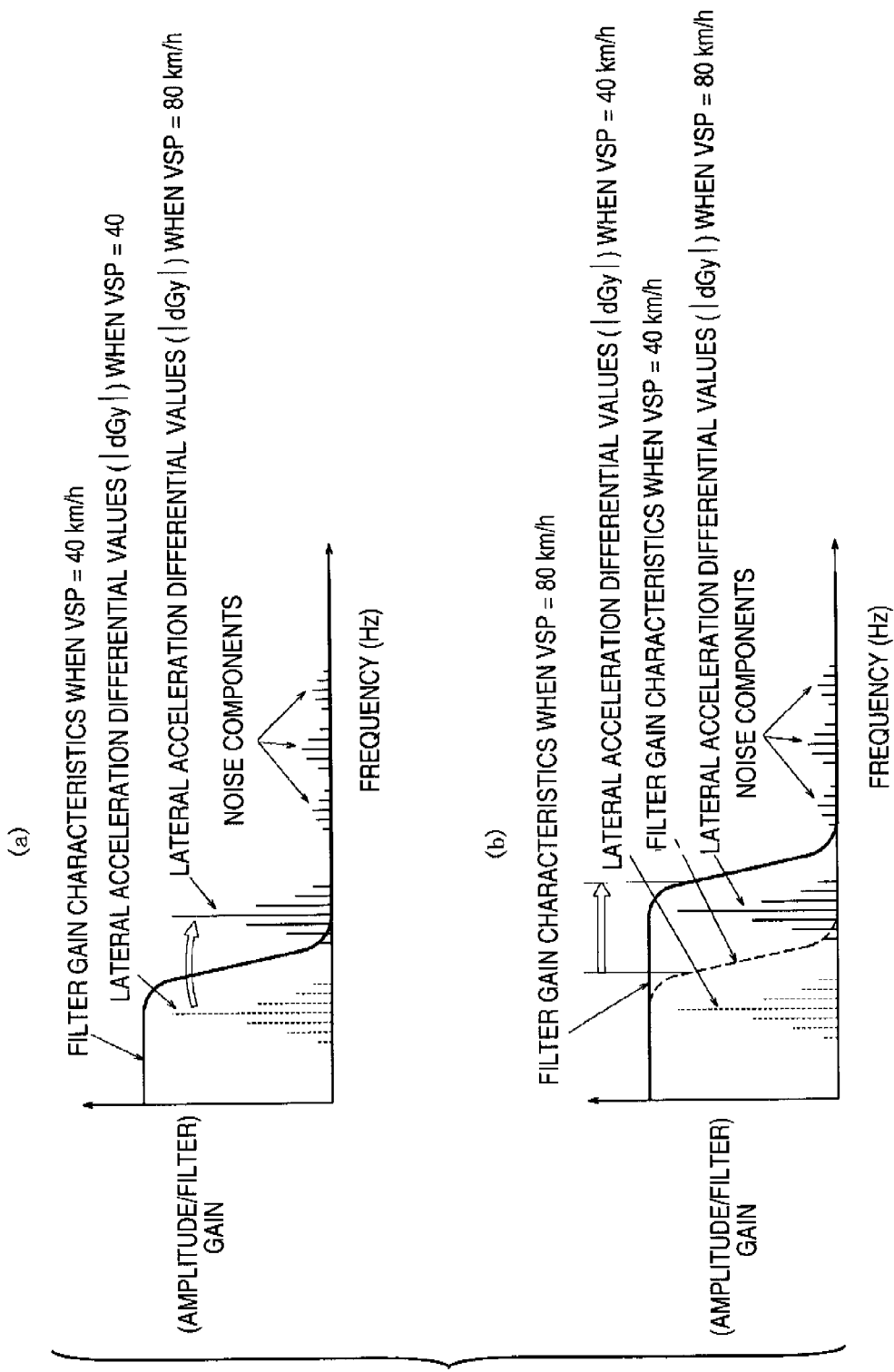
FIG. 7 is a pair of line characteristics diagrams showing the filter characteristics when the filter coefficient of the low-pass filter constituting the curving tendency calculation unit in FIG. 4 differs according to vehicle speed, with diagram (a) showing when the vehicle speed is 40 km/h, and diagram (b) showing the filter characteristics when the vehicle speed is 80 km/h.

Therefore, when the vehicle speed VSP is 40 km/h, the low-pass filter constituting the curving tendency calculation unit 24 has the filter gain characteristics shown in FIGS. 6 and 7(*a*), the lateral acceleration differential values |dGy| are extracted from the effective frequency range at the vehicle speed VSP of 40 km/h, and noise components can be removed from all other frequency ranges.

When the vehicle speed VSP is 80 km/h, the low-pass filter constituting the curving tendency calculation unit 24 has the filter gain characteristics shown in diagram (b) of FIG. 7, the lateral acceleration differential values |dGy| are extracted from the effective frequency range at the vehicle speed VSP of 80 km/h, and noise components can be removed from all other frequency ranges.

Figure 8:
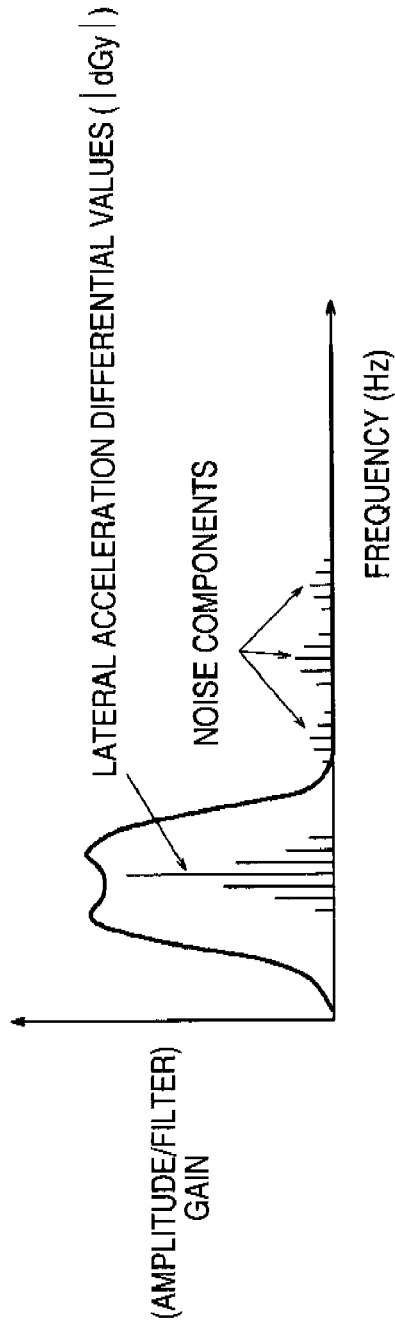
FIG. 8 is a line filter characteristics diagram showing another example of a low-pass filter constituting the curving tendency calculation unit in FIG. 4.
Figure 9:
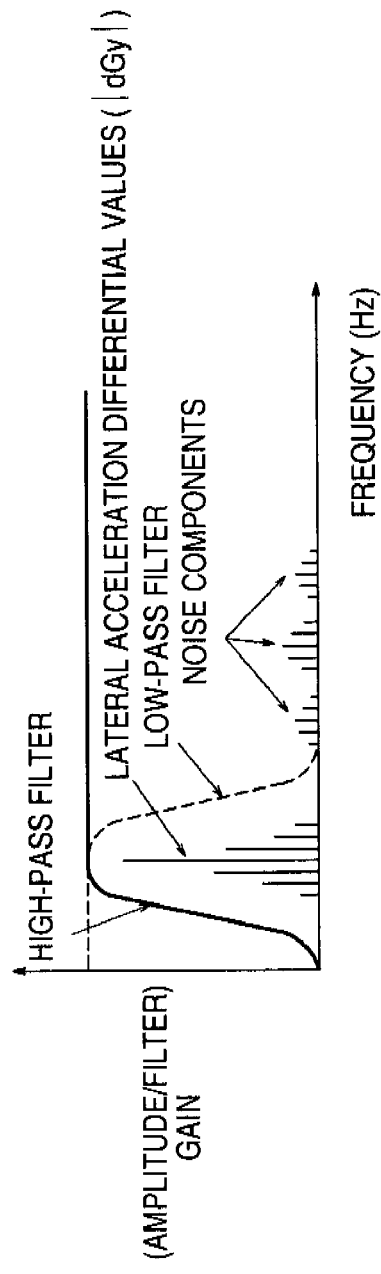
FIG. 9 is a line filter characteristics diagram showing yet another example of a low-pass filter constituting the curving tendency calculation unit in FIG. 4.

The low-pass filter constituting the curving tendency calculation unit 24 is not limited to a mere low-pass filter as long as it is capable of extracting lateral acceleration differential values |dGy| from different frequency ranges in accordance with the vehicle speed VSP. It is apparent that the filter can be a band-pass filter having filter gain characteristics such as those shown in FIG. 8, or the filter can be a combination of a low-pass filter and a high-pass filter such the one shown in FIG. 9.

Figure 10:
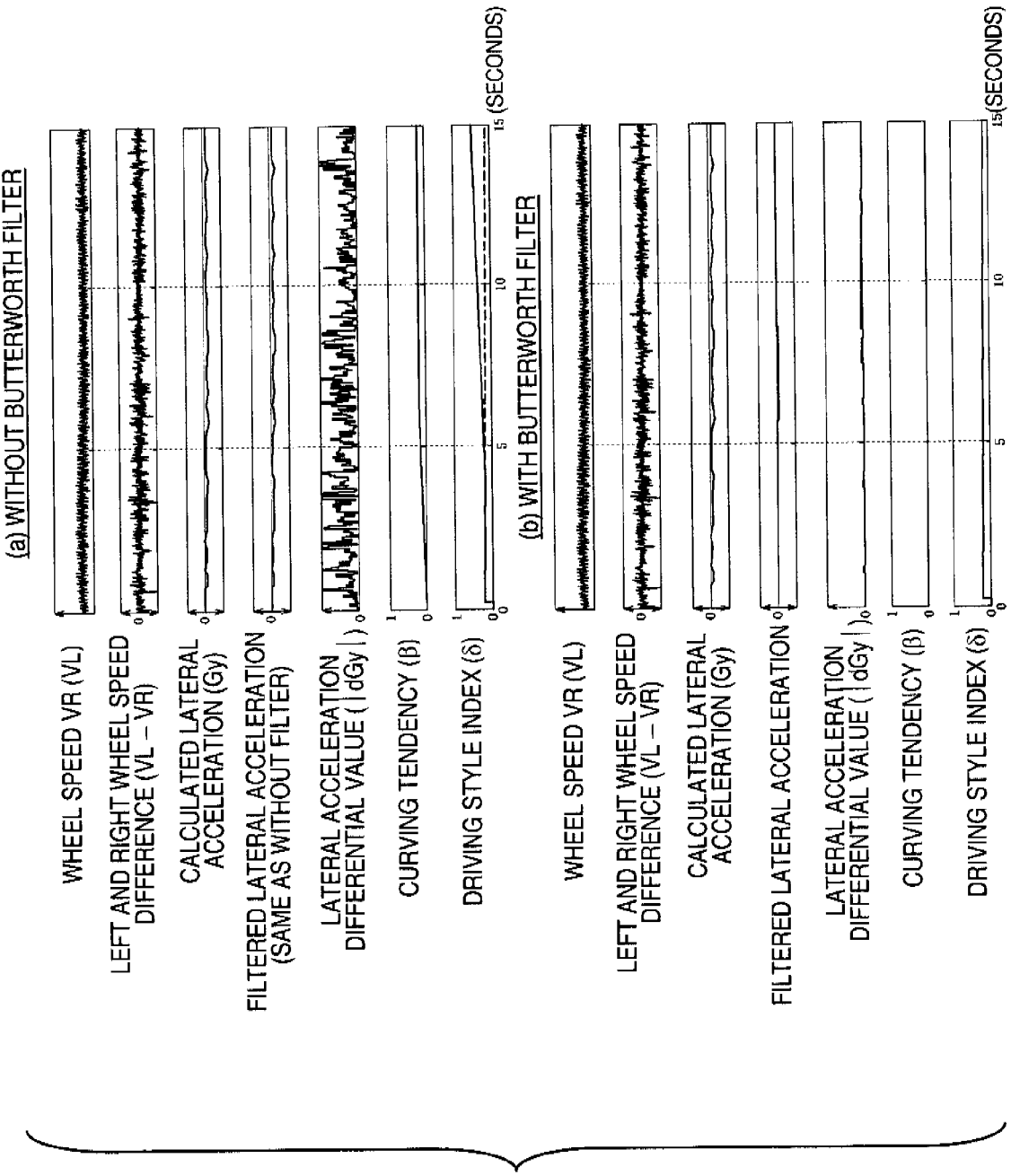
FIG. 10 is a pair of action time charts of the curving tendency detection unit in FIG. 4, with diagram (a) showing an action time chart of a case in which the Butterworth filter is not used, and diagram (b) showing an action time chart of a case in which the Butterworth filter is used.

The following is a description, made with reference to FIG. 10, of the effects of passing the lateral acceleration Gy calculated by the calculation unit 21 in FIG. 4 in the above-described manner through the Butterworth filter 22, and removing the lateral acceleration calculation errors included in the calculated value of the lateral acceleration Gy.

The chart (a) of FIG. 10 is an operation time chart for a case in which the vehicle travels straight ahead. In this case, the Butterworth filter 22 in FIG. 4 is not used and the calculated lateral acceleration Gy is inputted directly to the lateral acceleration differential value calculation unit 23 to contribute to the calculation of the lateral acceleration differential value |dGy|.

The chart (b) of FIG. 10 is an operation time chart for a case in which the vehicle travels straight ahead. In this case, the Butterworth filter 22 is provided as shown in FIG. 4, and the calculated lateral acceleration Gy is inputted to the lateral acceleration differential value calculation unit 23 after passing through the Butterworth filter 22 to contribute to the calculation of the lateral acceleration differential value |dGy|.

In cases in which the left and right wheel speeds VL and VR vary in a vibrating manner as a result of uneven terrain, as shown in the charts (a) and (b) of FIG. 10 (only one of the left and right wheel speeds VL and VR is shown in these diagrams), differences (VL−VR) arise between the two wheel speeds, as shown in the diagrams, despite the vehicle traveling straight ahead. This occurs because the fluctuations in the two wheel speeds are neither synchronized, nor have the same phase.

Therefore, the calculated lateral acceleration Gy produced by the calculation unit 21 in FIG. 4 in the above-described manner by using the wheel speed difference (VL−VR) also includes, as a factor that induces lateral acceleration, the wheel speed difference (VL−VR) between the left and right wheel speeds VL and VR that varies in a vibrating manner while shifted in phase, regardless of whether or not this wheel speed difference is a factor that induces lateral acceleration.

In cases in which the Butterworth filter 22 is not provided, the filtered lateral acceleration is the same as the calculated lateral acceleration Gy, as shown in chart (a) of FIG. 10. The filtered lateral acceleration is inputted directly to the lateral acceleration differential value calculation unit 23 in FIG. 4, and is used in the calculation of the lateral acceleration differential value |dGy|.

Consequently, as shown in chart (a) of FIG. 10, the lateral acceleration differential value |dGy| increases despite the vehicle traveling straight ahead. This occurs because this value is based on the calculated lateral acceleration Gy that includes calculated value components resulting from the wheel speed difference (VL−VR) between the left and right wheel speeds VL and VR that varies in a vibrating manner while shifted in phase due to uneven terrain or the like.

Therefore, as shown in chart (a) of FIG. 10, the curving tendency β in the vehicle roadway, which is calculated by the calculation unit 24 based on the lateral acceleration differential value |dGy|, is generated regardless of whether the vehicle is traveling straight ahead. The vehicle driving style index δ originally has only acceleration and deceleration tendencies, as shown by the dotted lines in chart (a) of FIG. 10, but acquires errors when determined based on the curving tendency β in the manner described below, as shown by the solid lines in chart (a) of FIG. 10.

In cases in which the Butterworth filter 22 is provided in the manner shown in FIG. 4, the result is that the filtered lateral acceleration is obtained by passing the calculated lateral acceleration Gy through the Butterworth filter 22 in the manner shown in chart (b) of FIG. 10. In other words, the calculated value components are removed from the calculated lateral acceleration Gy. The calculated value components are produced by the wheel speed difference (VL−VR) between the left and right wheel speeds VL and VR that varies in a vibrating manner while shifted in phase due to uneven terrain or the like. The filtered calculated lateral acceleration Gy is inputted to the lateral acceleration differential value calculation unit 23 in FIG. 4, and is used in the calculation of the lateral acceleration differential value |dGy|.

Consequently, the lateral acceleration differential value |dGy| is based on a calculated lateral acceleration Gy that does not include calculated value components produced by the wheel speed difference (VL−VR) between the left and right wheel speeds VL and VR that varies in a vibrating manner while shifted in phase due to uneven terrain or the like. The lateral acceleration differential value |dGy| remains at approximately 0 in correspondence with the straight travel, as shown in chart (b) of FIG. 10. Therefore, as shown in chart (b) of FIG. 10 the curving tendency β of the vehicle roadway determined by the calculation unit 24 based on the lateral acceleration differential value |dGy| remains at 0 in correspondence with the straight travel, and the vehicle driving style index δ determined based on the curving tendency β in the below-described manner has only acceleration and deceleration tendencies and is free of errors, as shown in the diagrams.

Figure 11:
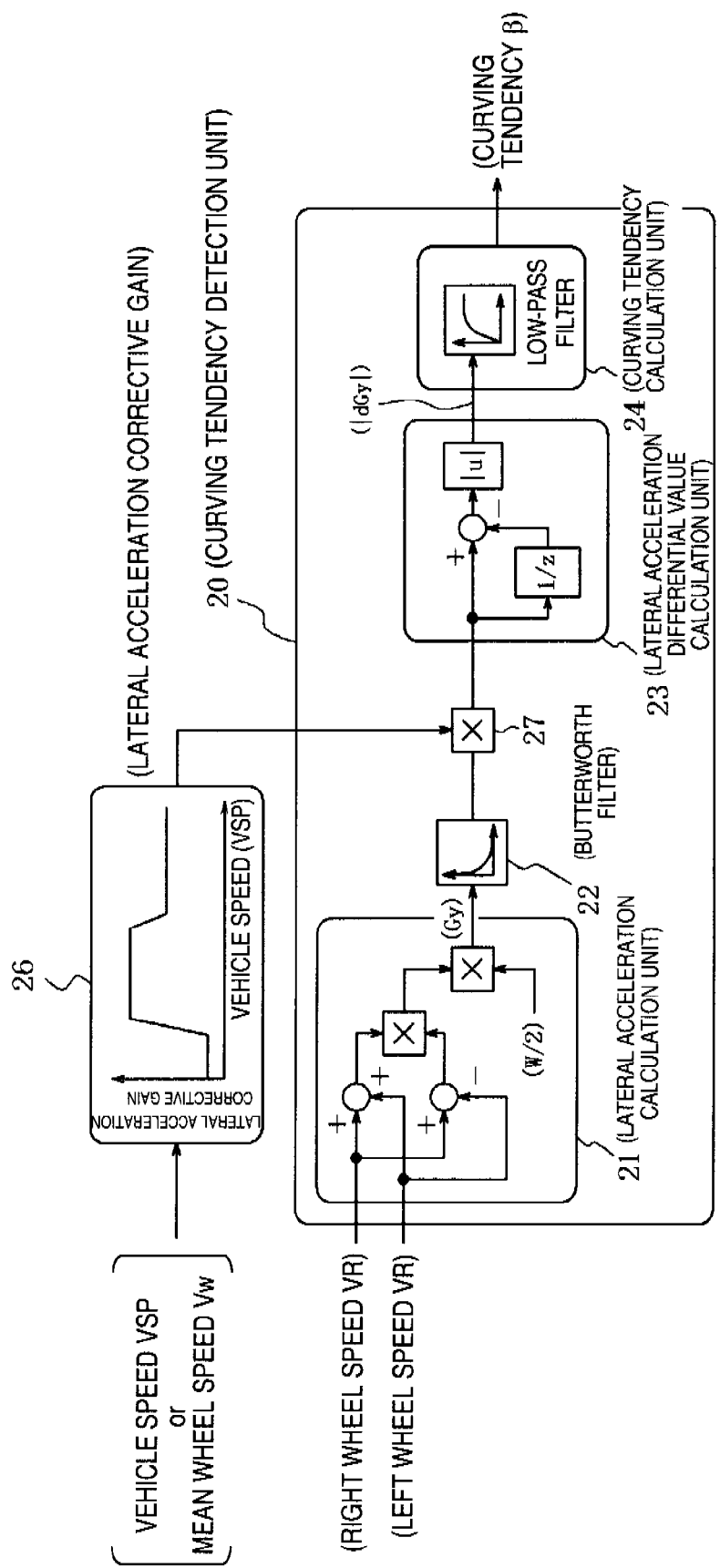
FIG. 11 is a schematic block diagram showing another example of the curving tendency detection unit in FIG. 1.

In FIG. 11, the same numerical symbols are used to depict the same components as FIG. 4 and to describe another embodiment of the curving tendency detection unit 20 shown in FIG. 1. In the present embodiment of FIG. 11, the calculated lateral acceleration Gy passed through the Butterworth filter 22 is not inputted directly to the lateral acceleration differential value calculation unit 23, but is rather corrected by a corrective gain set by a lateral acceleration corrective gain setting unit 26, so that a reduced calculated lateral acceleration Gy is obtained, particularly at low vehicle speeds. This corrected calculated lateral acceleration Gy is inputted to the lateral acceleration differential value calculation unit 23 during low vehicle speeds.

The lateral acceleration corrective gain setting unit 26 retrieves and sets a lateral acceleration corrective gain (a positive value less than 1) that decreases at low vehicle speeds. The gain is set using a prepared map based on the vehicle speed VSP (or the mean wheel speed Vw described in FIG. 5). A multiplier 27 then multiplies this corrective gain by the calculated lateral acceleration Gy that has passed through the Butterworth filter 22, and calculates a corrected calculated lateral acceleration Gy that decreases at low vehicle speeds.

Figure 12:
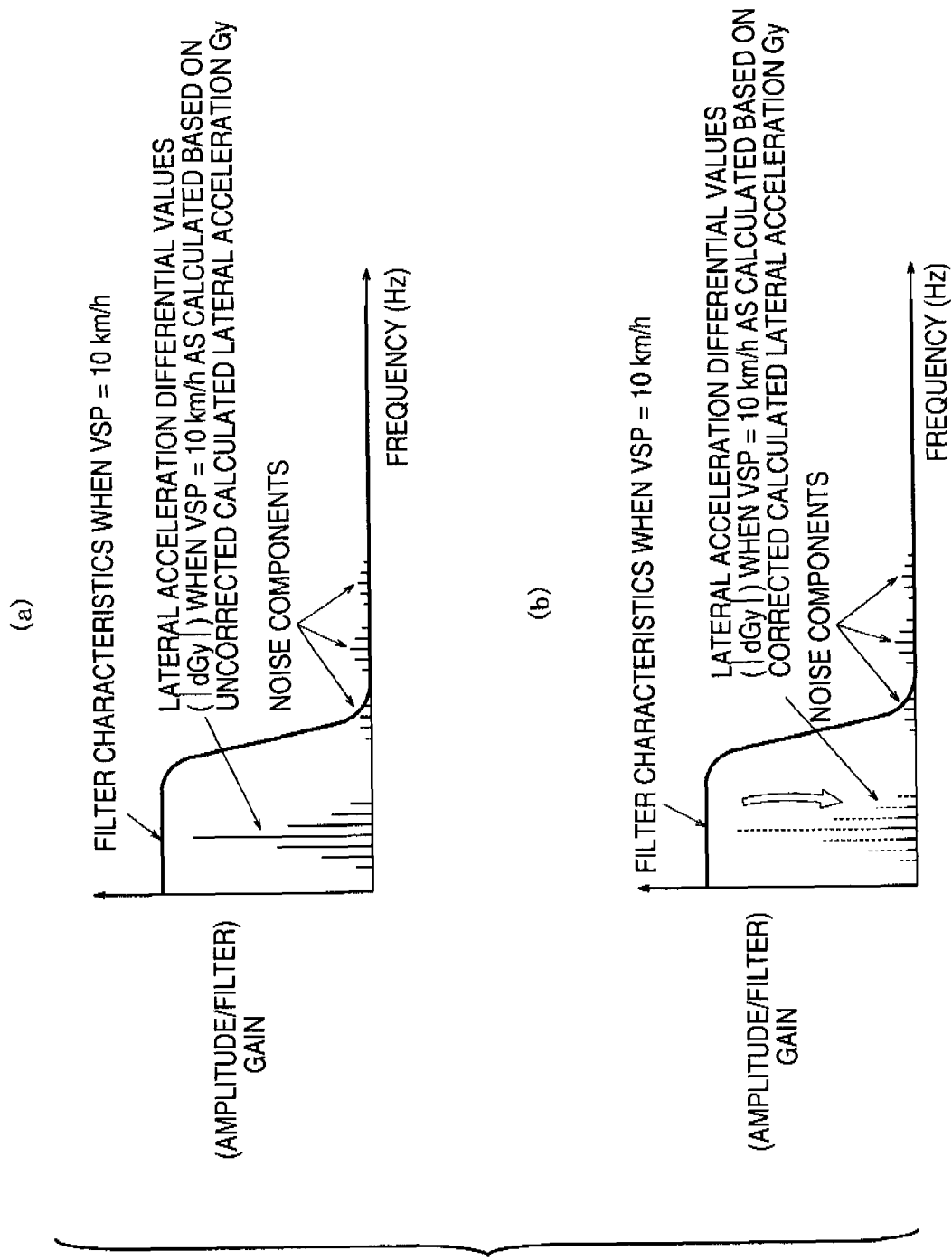
FIG. 12 is a pair of line characteristics diagrams showing the effects of correcting lateral acceleration with the corrective gain set by the lateral acceleration corrective gain setting unit in FIG. 11, with diagram (a) showing the level of lateral acceleration differential values determined based on uncorrected lateral accelerations, and diagram (b) showing the level of lateral acceleration differential values determined based on corrected lateral accelerations.

Therefore, when the vehicle speed VSP is 10 km/h, the lateral acceleration differential value |dGy|, which is calculated based on the corrected calculated lateral acceleration Gy by the lateral acceleration differential value calculation unit 23, is a small value, as shown in diagram (b) of FIG. 12, compared to the large value shown in diagram (a) of FIG. 12, which depicts a case in which the calculated lateral acceleration Gy is not corrected. The peak of the lateral acceleration differential value |dGy| can be reduced at low vehicle speeds.

Thus, the curving tendency β determined based on the lateral acceleration differential value |dGy| by the curving tendency calculation unit 24 in the above-described manner decreases at low vehicle speeds. Thus, there is no need at low vehicle speeds for the below-described vehicle response control to be performed using this curving tendency β. At low vehicle speeds on a curving road having the same curving tendency β, there is no need for vehicle response control such the one performed at high vehicle speeds. It is possible to prevent unnecessary vehicle response control from being performed at such times.

When the curving tendency β of the vehicle roadway is detected based on the lateral acceleration Gy of the vehicle in the curving tendency detection system of the embodiments described above, this lateral acceleration Gy is not used directly, but the curving tendency β is detected based on the lateral acceleration differential value |dGy|, which is the rate at which the lateral acceleration varies over time.

Figure 13:
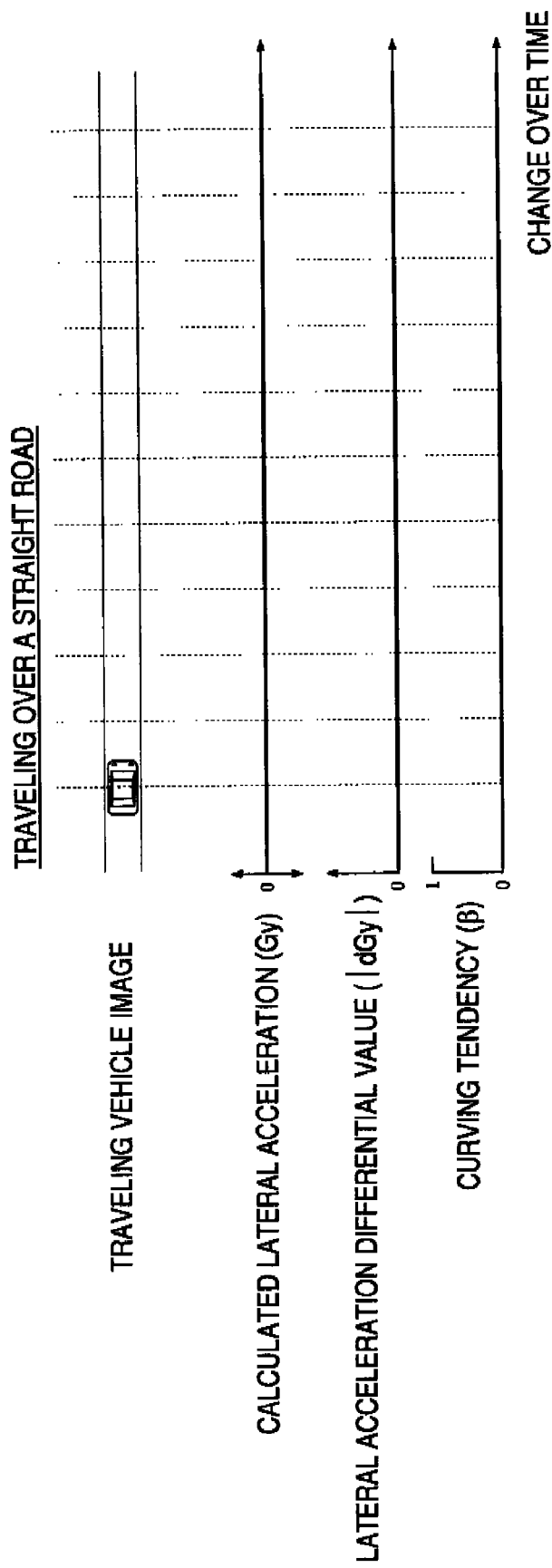
FIG. 13 is an action time chart for the curving tendency detection units shown in FIGS. 4 and 11 when the vehicle is traveling over a straight road.

FIG. 13 shows the manner in which the calculated lateral acceleration Gy, the lateral acceleration differential value |dGy|, and the curving tendency β while the vehicle is traveling over a straight road, as shown by the traveling vehicle image. As can be seen in this diagram, since the road is straight, the calculated lateral acceleration Gy remains continuously at 0, the lateral acceleration differential value |dGy| remains continuously at 0, and the curving tendency β determined by normalization to 0 or 1 based on the lateral acceleration differential value dGy also remains at 0 as a matter of course.

Figure 14:
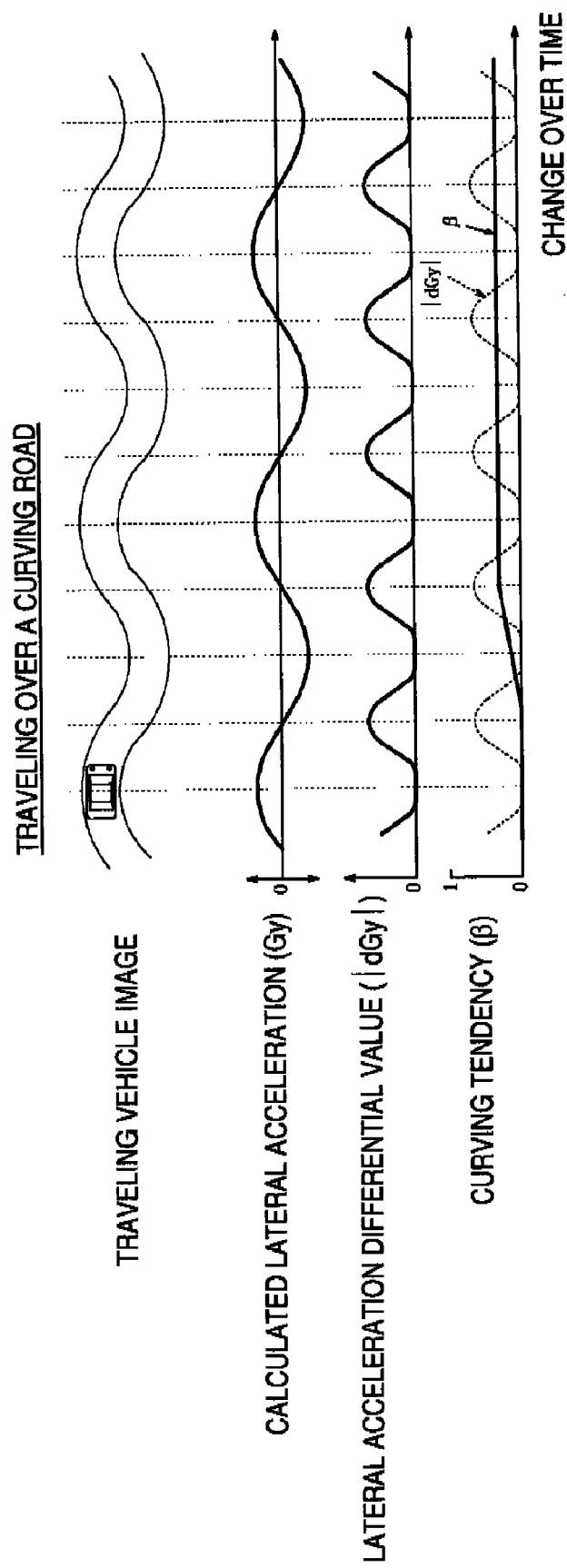
FIG. 14 is an action time chart for the curving tendency detection units shown in FIGS. 4 and 11 when the vehicle is traveling over a curving road.

FIG. 14 shows the change over time in the calculated lateral acceleration Gy, the lateral acceleration differential value |dGy|, and the curving tendency β while the vehicle is traveling over a curving road, as shown by the traveling vehicle image. As can be seen in this diagram, the curving road produces a calculated lateral acceleration Gy shaped a sine waveform that has 0 as the origin and corresponds to the curves in the road. The lateral acceleration differential value |dGy|, which is the rate at which the acceleration varies over time, has a sine waveform that continuously changes while remaining positive, as shown in the diagram. The curving tendency β determined by normalizing the mean output level of the lateral acceleration differential value |dGy| to 0 or 1, in the above-described manner, is at a level corresponding to the amplitude and variation frequency of the lateral acceleration differential value |dGy|. It is possible to determine that the curving tendency of the vehicle roadway increases (the curving frequency is higher and the curvature is greater) with an increase in this level.

Also, the output of the curving tendency β is low in relation to the initial change in the lateral acceleration differential value |dGy|. This occurs because the curving tendency β is calculated based on the lateral acceleration differential value |dGy| extracted after the value has passed through a filter having a time delay element. It is thereby possible to estimate the tendency of a road to have a long-lasting curve.

Figure 15:
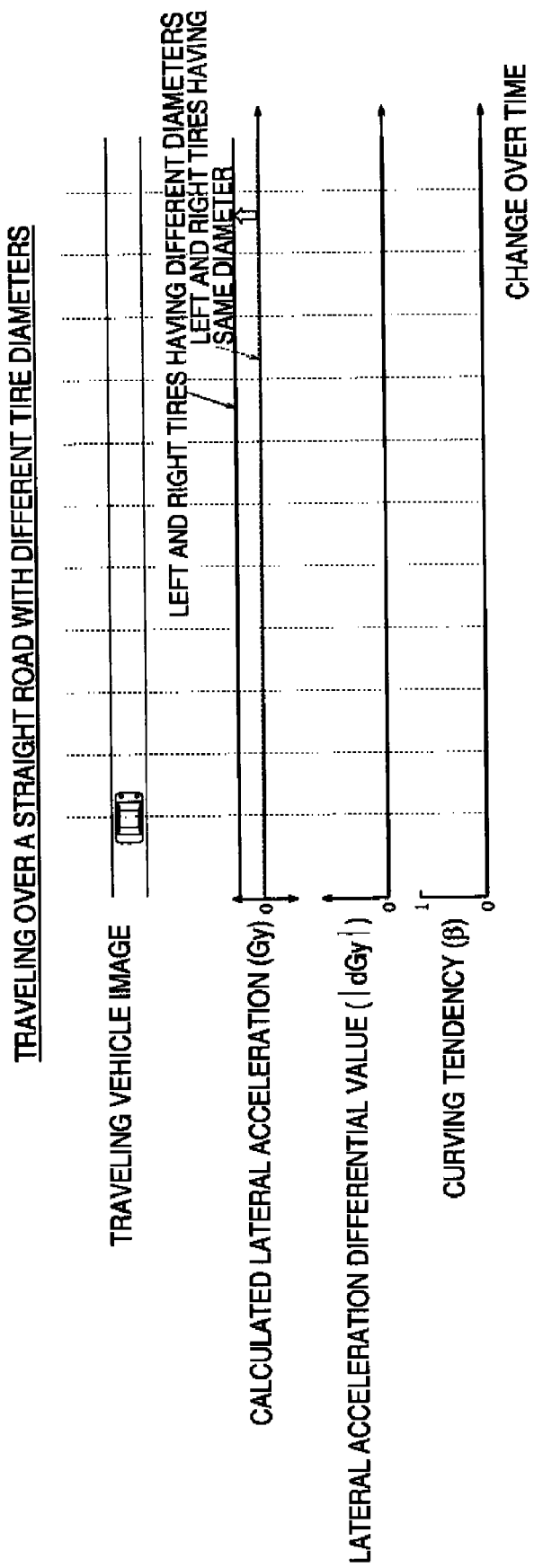
FIG. 15 is an action time chart for the curving tendency detection units shown in FIGS. 4 and 11 when a vehicle whose left and right tires have different effective diameters is traveling over a straight road.

FIG. 15 shows the change over time in the calculated lateral acceleration Gy, the lateral acceleration differential value |dGy|, and the curving tendency β while a vehicle having different tire diameters is traveling over a straight road, as shown by the traveling vehicle image. The left and right tires have different effective diameters due to differences in tire wear or air pressure between the left and right wheels, or one of the left or right wheels being flat.

In this case, as is clear from FIG. 15, although the road is straight, the result of the left and right tires having different effective diameters is that the calculated lateral acceleration Gy is no longer 0, but is a value proportionate to the lateral acceleration corresponding to the difference in the effective diameters of the left and right tires (difference in left and right wheel speeds).

However, the difference in speed between the left and right wheels that results from differences in the effective diameters in the left and right tires is constant, and the calculated lateral acceleration Gy has a constant value, as shown in FIG. 15. Consequently, the lateral acceleration differential value |dGy| remains continuously at 0, and the curving tendency β determined by normalizing the mean output level of the lateral acceleration differential value to 0 or 1 based on the lateral acceleration differential value dGy also remains at 0 as a matter of course.

Therefore, although the calculated lateral acceleration Gy is a result of a difference in the effective diameters of the left and right tires, this does not affect the detection of the curving tendency β in the roadway, and it is possible to prevent the curving tendency β from being mistakenly detected when the left and right tires have different effective diameters.

Figure 16:
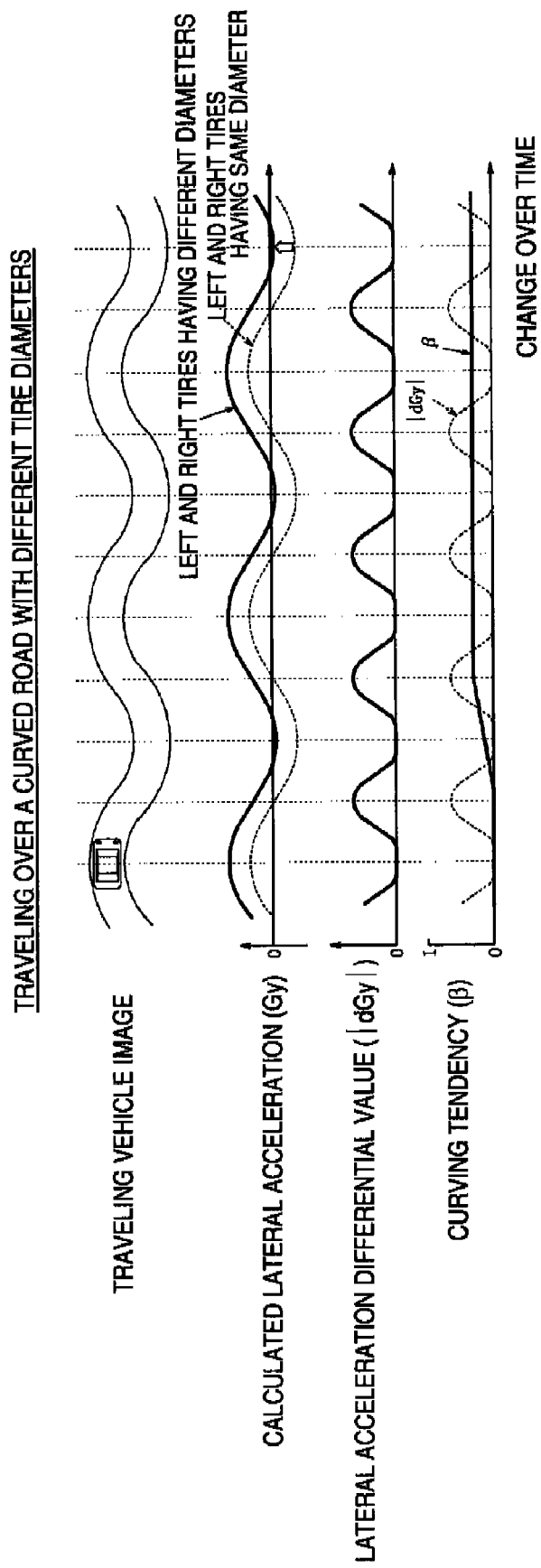
FIG. 16 is an action time chart for the curving tendency detection units shown in FIGS. 4 and 11 when a vehicle whose left and right tires have different effective diameters is traveling over a curving road.

FIG. 16 shows the change over time in the calculated lateral acceleration Gy, the lateral acceleration differential value |dGy|, and the curving tendency β while a vehicle whose left and right tires have different effective diameters is traveling over a curving road, as shown by the traveling vehicle image.

In this case, as can be seen from FIG. 16, since the road curves, the calculated lateral acceleration Gy has a sine waveform corresponding to the curving of the road, but this waveform is greater, by a value proportionate to the lateral acceleration corresponding to the difference in the effective diameters of the left and right tires (difference in left and right wheel speeds) as shown in the diagram, than the sine waveform of the calculated lateral acceleration Gy (the same as in FIG. 14) when the left and right tire diameters are the same, as shown by the dotted line.

However, if the curving tendency is the same, the sine waveform of the calculated lateral acceleration Gy is the same both when the left and right tire diameters are the same (as shown by the dotted line) and when the left and right tire diameters are different (as shown by the solid line). Similar to FIG. 14, the lateral acceleration differential value |dGy|, which is the rate at which the acceleration varies over time, has a sine waveform that changes continuously while remaining positive, as shown in FIG. 16. The curving tendency β determined by normalizing the mean output level of the lateral acceleration differential value |dGy| to 0 or 1 is also the same as in FIG. 14.

Therefore, if the difference in effective diameters between the left and right tires causes the calculated lateral acceleration Gy to increase by a value proportionate to the lateral acceleration corresponding to the difference in the effective diameters of the left and right tires (the difference in left and right wheel speeds), then this increase does not affect the detection of the curving tendency β of the roadway. Also it is possible to prevent the curving tendency β from being mistakenly detected when the left and right tires have different effective diameters.

The select-high switch 30 in FIG. 1 outputs the larger MAX (α, β) of the two signals as the driving state signal γ (a value normalized to 0 or 1) selected from the vehicle acceleration/deceleration tendency signal α (a value normalized to 0 or 1) detected by the acceleration/deceleration tendency sensor 10 as described above, and the vehicle roadway curving tendency signal β (a value normalized to 0 or 1) detected in the previous embodiments by the detection unit 20 as described above.

The driving state signal γ=MAX (α, β) from the select-high switch 30 (from the vehicle driving state signal generating unit 40) is inputted to the driving style determination unit 50, and the driving style determination unit 50 filters the driving state signal γ to determine a driving style index δ (sporty driving style or luxury driving style) that is normalized to 0 or 1 based on the mean output level of the signal γ.

The time constant used by the driving style determination unit 50 to filter the driving state signal γ is established in accordance with the vehicle driving state determined by the time constant selection unit 60 from the longitudinal acceleration Gx, the vehicle speed VSP, and the accelerator position APO. The driving style index δ (sporty driving style, luxury driving style) can be reliably and accurately determined in all possible driving states.

Figure 17:
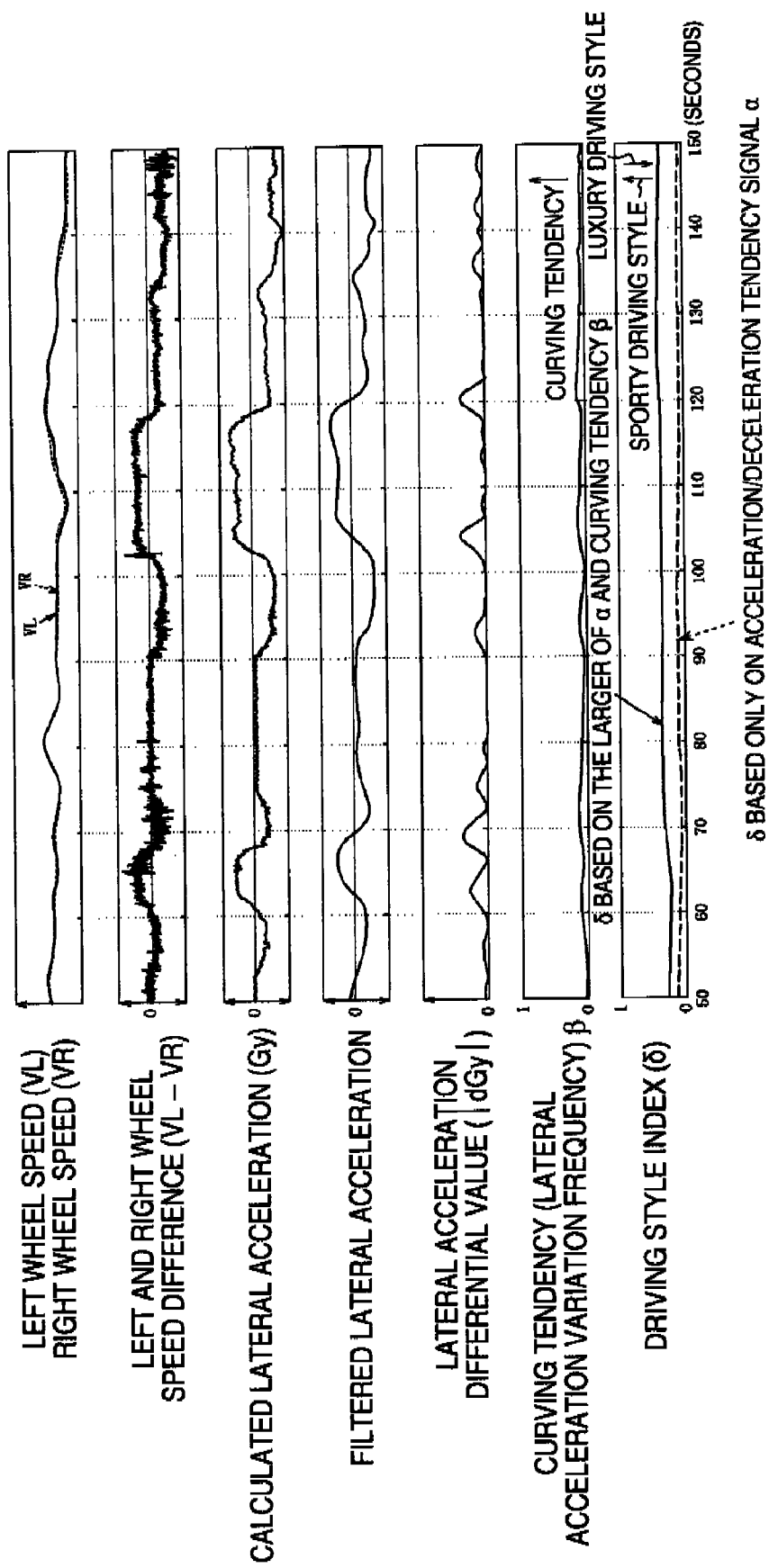
FIG. 17 is an action time chart obtained from the driving style determination apparatus shown in FIG. 1.

The following is a description of the process for detecting the driving style index δ in accordance with FIG. 1 in a case in which the left and right wheel speeds VL and VR are as shown in FIG. 17.

As shown in FIG. 17, the calculated lateral acceleration Gy obtained in the above-described manner by the lateral acceleration calculation unit 21 (see FIG. 4) based on the wheel speed difference (VR−VL) between the left and right wheel speeds VL and VR varies over time. Also the filtered lateral acceleration after the calculated lateral acceleration Gy is passed through the Butterworth filter 22 varies over time.

Furthermore, the lateral acceleration differential value |dGy| calculated in the above-described manner by the lateral acceleration differential value calculation unit 23 (see FIG. 4) based on the filtered lateral acceleration varies over time. The curving tendency (lateral acceleration variation frequency) β in a roadway calculated in the above-described manner by the curving tendency calculation unit 24 (see FIG. 4) based on the lateral acceleration differential value |dGy| also varies over time.

The driving style index δ is detected in accordance with FIG. 1 by using as the driving state signal γ the larger of the two signals selected from the acceleration/deceleration tendency signal α (a value normalized to 0 or 1) provided by the sensor 10, and the curving tendency signal β (a value normalized to 0 or 1) provided by the detection unit 20. The driving state signal is then used in the calculation of the driving style index δ. The following operational effects can therefore be obtained.

Specifically, when the driving style index δ is calculated using only the acceleration/deceleration tendency signal α, the driving style index δ is low, as shown by the dashed line at the lowest level of FIG. 17, in cases in which the road curves but the acceleration/deceleration tendency signal α is not very strong, and a luxury driving style is concluded to be followed, regardless of the fact that the road curves.

According to the driving style index δ in FIG. 1, the larger of the two signals selected from the acceleration/deceleration tendency signal α (a value normalized to 0 or 1) and the curving tendency signal β (a value normalized to 0 or 1) is used as the driving state signal γ in the calculation of the driving style index δ. Therefore, the driving style index δ is high, as shown by the solid line at the lowest level of FIG. 17, in proportion to the curving tendency β commensurate with the curving road. This is true even if the driver is driving in a manner such that the acceleration/deceleration tendency signal α does not increase despite the curving road. A corresponding sporty driving style can thus be reliably concluded to be followed on curving roads.

Figure 18:
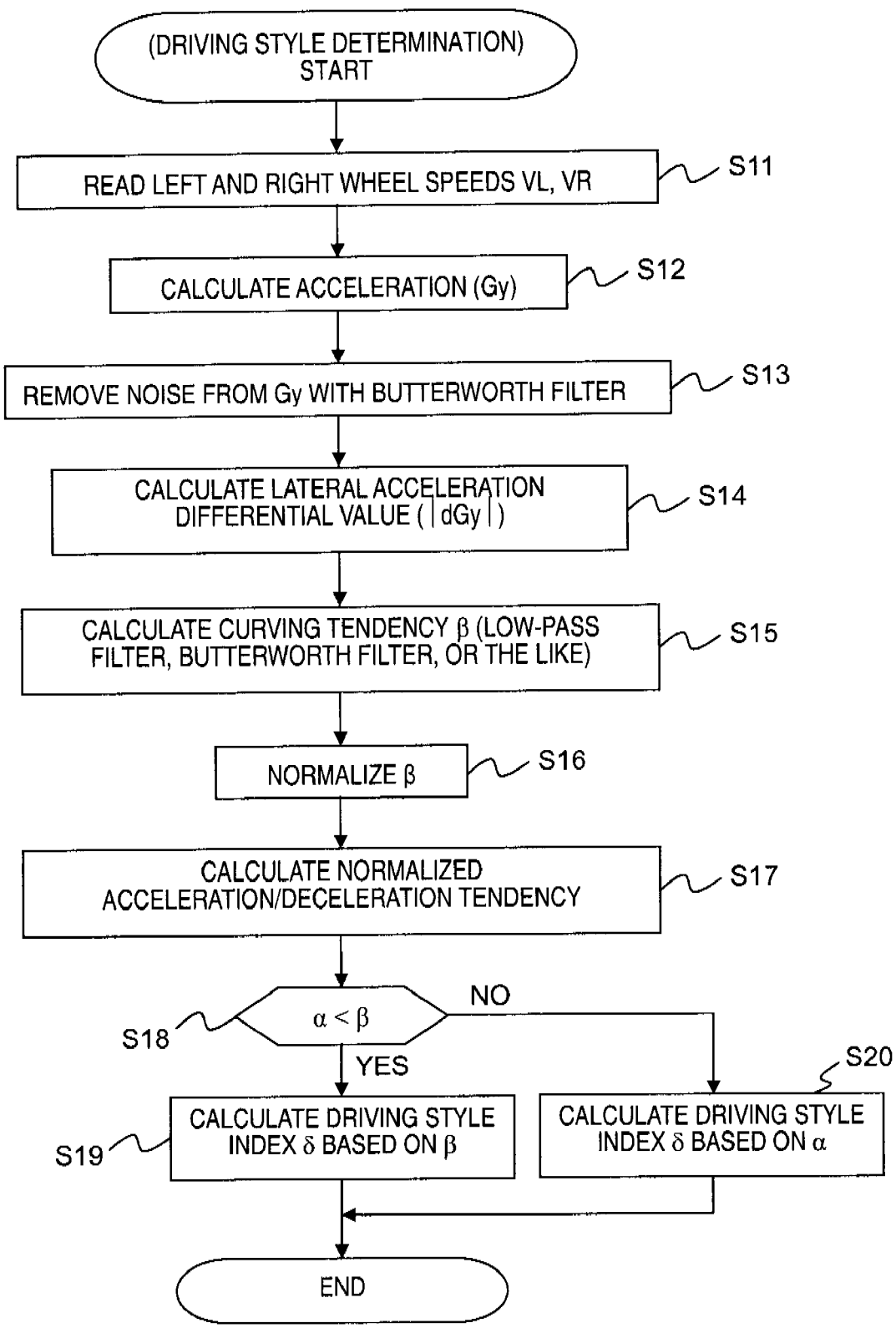
FIG. 18 is a flowchart showing the process of a driving style determination program executed by a microcomputer of the driving style determination apparatus shown in FIG. 1.
Figure 19:
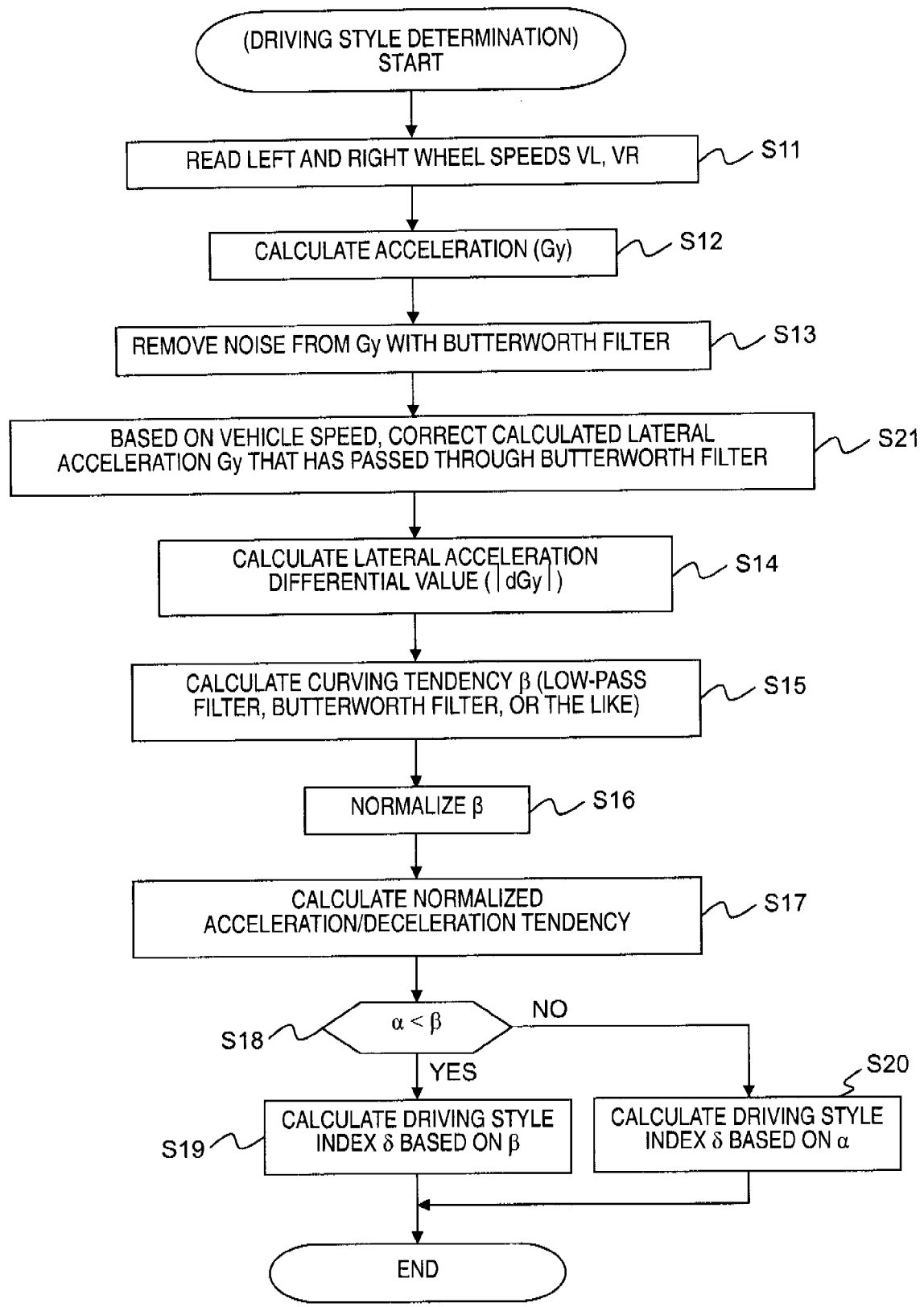
FIG. 19 is a flowchart showing the process of a driving style determination program executed by the microcomputer of the curving tendency detection unit in the driving style determination apparatus shown in FIG. 1 is switched to the unit in FIG. 11, and the driving style determination apparatus.

In cases in which the driving style determination device in FIG. 1 is configured from a microcomputer, the computer control program is as shown in FIG. 18 or 19. FIG. 18 shows a driving style determination program for a case in which the curving tendency detection unit 20 in FIG. 1 is as shown in FIG. 4, and FIG. 19 shows a driving style determination program for a case in which the curving tendency detection unit 20 in FIG. 1 is as shown in FIG. 11.

The driving style determination program will first be described with reference to FIG. 18.

In step S11, the left and right wheel speeds VL and VR are read.

In step S12, the lateral acceleration Gy is calculated according to the same process as the one performed by the calculation unit 21 in FIG. 4.

Next, in step S13, the noise included in the calculated lateral acceleration Gy is removed through the filtering process described above, e.g., by the Butterworth filter 22 in FIG. 4.

In step S14, the lateral acceleration differential value |dGy|, which is the rate at which the lateral acceleration Gy varies over time, is calculated through the same process as the one performed by the calculation unit 23 in FIG. 4.

In step S15, the curving tendency β (the frequency and amount of curvature) is determined based on the lateral acceleration differential value |dGy| through the same process as the one performed by the calculation unit 24 in FIG. 4.

In step S16, the curving tendency β is normalized to a numerical value of 0 or 1 through the same process as described above.

In step S17, the acceleration/deceleration tendency signal α, which is normalized to a numerical value of 0 or 1, is calculated based on the longitudinal acceleration Gx and the vehicle speed VSP through the same process as the one performed by the detection unit 10 (refer to FIG. 3 for details) in FIG. 4.

In the next step S18, a comparison is drawn between the acceleration/deceleration tendency α and the curving tendency β, which are both normalized.

If α<β, then the driving style index δ is calculated in step S19 based on the larger curving tendency β and through the same process as the one performed by the determination unit 50 in FIG. 1.

If α>β, then the driving style index δ is calculated in step S20 based on the larger acceleration/deceleration tendency α and through the same process as the one performed by the determination unit 50 in FIG. 1.

The driving style determination program will now be described with reference to FIG. 19. In this case, step S21 is added between steps S13 and S14 of FIG. 18.

In the additional step S21, the calculated lateral acceleration Gy, which is the result obtained in step S13 after removing noise through the filtering process of the one performed by the Butterworth filter 22 in FIG. 11, is corrected so as to be smaller at low vehicle speeds. The process is the same as the one performed by the lateral acceleration corrective gain setting unit 26 and the multiplier 27 in FIG. 11.

The corrected calculated lateral acceleration Gy is used in the calculation of the lateral acceleration differential value |dGy| in step S14 in the above-described manner, whereby the peak of the lateral acceleration differential value |dGy| is kept at low vehicle speeds as previously described with reference to diagram (b) of FIG. 12.

The driving style index δ (sporty driving style or luxury driving style) determined in the previous embodiments can be used in the gearshift control of a continuously variable transmission, as shown, e.g., in FIG. 2, and can also be used for the action response control of the vehicle.

In FIG. 2 a gearshift control map 71 displays target input rotational speeds Ni of the continuously variable transmission; 72 is a map of lower limits for target input rotational speeds during sporty-style driving, displaying lower limits NLim (Sporty) of the target input rotational speed of the continuously variable transmission during sporty-style driving; and the numerical symbol 73 indicates a map of lower limits for target input rotational speeds during luxury-style driving, displaying lower limits NLim (Luxury) of the target input rotational speed of the continuously variable transmission during luxury-style driving.

The gearshift control map 71 retrieves, based on the accelerator position APO and the vehicle speed VSP, the optimum target input rotational speed Ni of the continuously variable transmission for the current driving state.

The map 72 of lower limits for target input rotational speeds during sporty-style driving determines for each vehicle speed VSP a lower limit NLim (Sporty) of a comparatively high target input rotational speed during sporty-style driving of the continuously variable transmission.

The map 73 of lower limits for target input rotational speeds during luxury-style driving determines for each vehicle speed VSP a lower limit NLim (Luxury) of a comparatively low target input rotational speed (in the same manner as with the higher target input rotational speed in the gearshift control map 71) during luxury-style driving of the continuously variable transmission.

An interpolation computation unit 74 uses an interpolation computation to determine which limit from among the lower limit NLim of the target input rotational speed during sporty-style driving (Sporty) and the lower limit NLim of the target input rotational speed during luxury-style driving (Luxury) should be used for the lower limit NLim of the target input rotational speed. The interpolation is performed based on the current driving style index δ and vehicle speed VSP. The determination is made in accordance with the aforementioned driving style index δ (an intermediate value between the sporty driving style and the luxury driving style).

A select-high switch 75 selects, as a controlled target input rotational speed Ni (Lim), the larger of the two values selected from the target input rotational speed Ni in the gearshift control map 71 and the lower limit NLim of the target input rotational speed in the interpolation computation unit 74, and controls the gear shifting of the continuously variable transmission so that the actually inputted rotational speed of the continuously variable transmission coincides with the controlled target input rotational speed Ni (Lim).

When the shifting of gears in a continuously variable transmission is controlled in accordance with the driving style index δ (an intermediate value between the sporty driving style and the luxury driving style), the more sporty the driving style index δ is, the nearer the controlled target input rotational speed Ni (Lim) draws to the comparatively high lower limit NLim of the target input rotational speed (Sporty) during sporty-style driving. As a result, the continuously variable transmission tends to select lower gearshift ratios where a high input rotational speed is maintained, the vehicle quickly responds to the depression of the accelerator by the driver, and it is possible to achieve a vehicle response that is preferable during sporty-style driving.

The vehicle response control based on the driving style index δ is not limited to the gearshift control for the continuously variable transmission described above with reference to FIG. 2, and can also be damping force control for a shock absorber, as shown in FIG. 20, rigidity switching control for a roll-reducing stabilizer as shown in FIG. 21, or steering assist force control for power steering as shown in FIG. 22.

In the damping force control for a shock absorber shown in FIG. 20, a shock absorber controller 76 essentially establishes a target damping force for the shock absorber in accordance with the vehicle speed VSP, a brake switch signal, and other types of vehicle information, and controls the open position of a damping force adjustment orifice 78 for the shock absorber via a drive device 77 such as a motor or a hydraulic solenoid, so that the damping force of the shock absorber coincides with this target force.

The driving style index δ (intermediate value between the sporty driving style and the luxury driving style) is such that the closer the driving style index δ is to a sporty driving style, the greater the target damping force is and the smaller is the opening of the damping force adjustment orifice 78.

The behavior of the vehicle can thereby be made more responsive to the steering of the driver, and a vehicle response that is preferable for sporty-style driving can be obtained.

In the rigidity switching control for a roll-reducing stabilizer shown in FIG. 21, a stabilizer controller 79 essentially establishes a target rigidity for a stabilizer in accordance with the vehicle speed VSP, the steering angle θ, and other types of vehicle information, and operates a stabilizer rigidity switching mechanism 91 via a drive device 80 such as a motor or a hydraulic solenoid, so that the rigidity of the stabilizer coincides with this target rigidity.

The driving style index δ (intermediate value between the sporty driving style and the luxury driving style) is such that the closer the driving style index δ is to a sporty driving style, the greater the target rigidity is and the greater is the rigidity of the stabilizer.

The vehicle can thereby be prevented from rolling while the driver is steering, and it is possible to achieve a vehicle response that is preferable during sporty-style driving.

In the steering assist force control for power steering shown in FIG. 22, a power steering controller 92 essentially establishes a target assist force for power steering in accordance with the vehicle speed VSP, the steering angle θ, and other types of vehicle information, and operates a power steering assist mechanism 94 via a drive device 93 such as a motor or a hydraulic solenoid so that the power steering assist force coincides with this target force.

The driving style index δ (intermediate value between the sporty driving style and the luxury driving style) is such that the nearer the driving style index δ is to a sporty driving style, the smaller the target assist force is and the stronger is the steering force.

Stable steering characteristics and a vehicle response that are preferable during sporty-style driving can thereby be obtained.

In the first embodiment, an example was described wherein a curving tendency in a vehicle roadway was estimated based on a differential value of the lateral acceleration of the vehicle. According to another possible embodiment, a curving tendency in the running state of the vehicle is estimated based on a differential value of the lateral acceleration of the vehicle. Details that are similar to those in the first embodiment are not described, and only differences are described.

Figure 23:
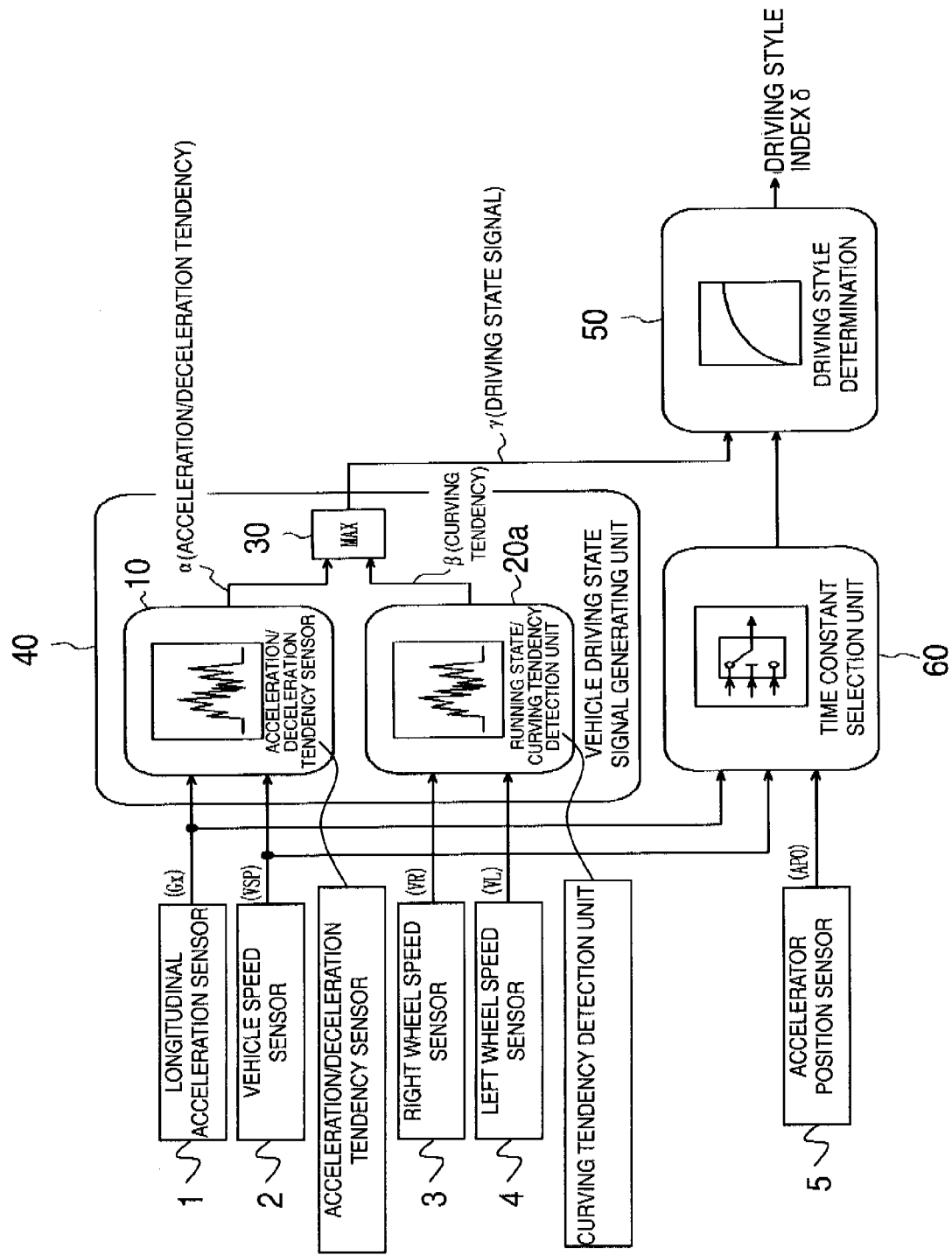
FIG. 23 is a schematic block diagram showing a vehicle driving style determination apparatus comprising a vehicle roadway curving tendency detection unit.
Figure 24:
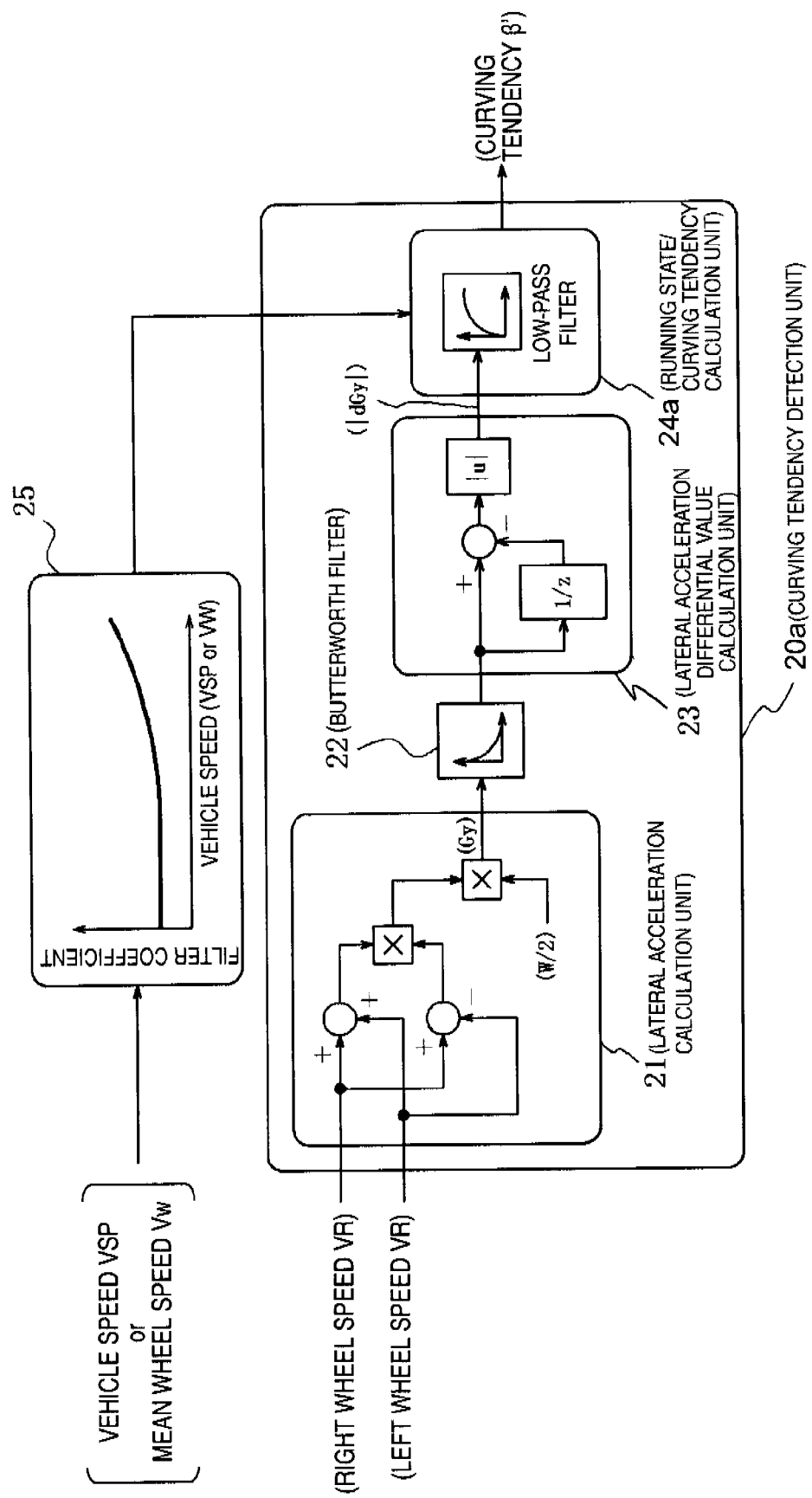
FIG. 24 is a schematic block diagram showing the details of the running state/curving tendency detection unit in FIG. 23.

In this embodiment, as shown in FIG. 23, the curving tendency detection device includes a running state/curving tendency detection unit 20a that detects a curving tendency in the running state of the vehicle. Also in this embodiment, as shown in FIG. 24, the running state/curving tendency detection unit 20a includes a running state/curving tendency calculation unit 24a that calculates the curving tendency β' in the running state of the vehicle, as shown in FIG. 24. Basically, the running state/curving tendency detection unit 20a operates in the same manner as the running state/curving tendency detection unit 20 as discussed above, except that the determination is used for determining the running state/curving tendency of the vehicle instead of the roadway. Of course, the curving tendency detection unit of FIG. 11 can also be used for determining the running state/curving tendency of the vehicle instead of the roadway in the running state/curving tendency detection unit 20a.

Figure 25:
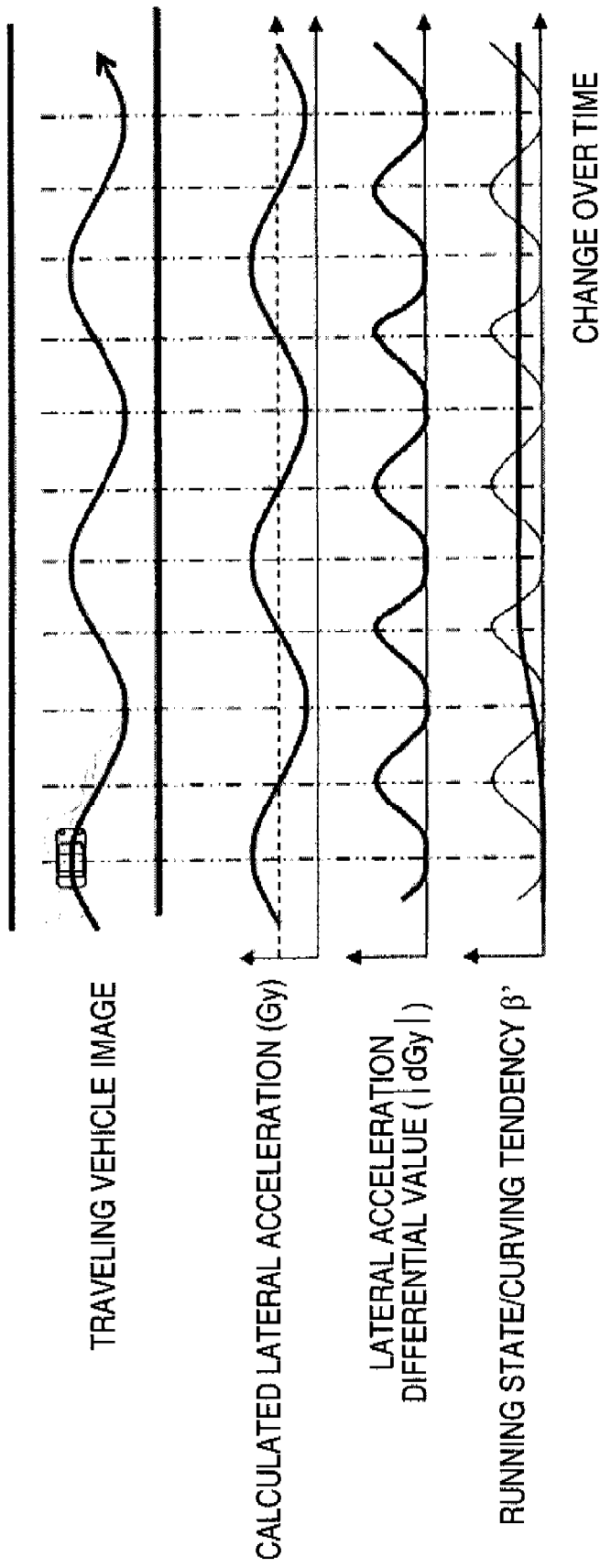
FIG. 25 is an action time chart for the running state/curving tendency detection unit shown in FIG. 24 when the vehicle is traveling over a curving road.

FIG. 25 shows the change over time in the calculated lateral acceleration Gy, the lateral acceleration differential value |dGy|, and the curving tendency β' in the running state while the vehicle is traveling over curves, as shown by the traveling vehicle image. As is clear from this diagram, since the running state of the vehicle corresponds to a travel along a curve, the calculated lateral acceleration Gy is shaped as a sine waveform that has 0 as the original and corresponds to the running state of the vehicle. The curving tendency β' in the running state, as determined by normalizing to 0 or 1 the mean output level of the lateral acceleration differential value |dGy|, which is the rate at which the calculated lateral acceleration Gy varies over time, reaches a level corresponding to the amplitude and variation frequency of the lateral acceleration differential value |dGy|, and it can be determined that the higher this level is, the greater is the a curving tendency in the running state of the vehicle (the greater the degree of curvature and the higher the frequency of curving in the running state of the vehicle). It is also possible to prevent a curving tendency β' in the running state from being mistakenly detected when the left and right tires have different effective diameters. This is because the curving tendency of the vehicle running state is estimated based on the lateral acceleration differential value |dGy|. Thus, the curving tendency β' in the running state of the vehicle can be estimated in the same manner as the curving tendency β in the roadway as discussed above. In other words, the descriptions and drawings used to describe the curving tendency β in the roadway also applies to the curving tendency β' in the running state of the vehicle, which may be meandering along a straight road, as shown in FIG. 25.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A curving tendency detection device comprising:
   a detection device that produces one or more signals that is used to indicate lateral acceleration for a vehicle;
   a lateral acceleration differential value calculation section configured to calculate lateral acceleration differential values of the lateral acceleration acting on the vehicle as the lateral acceleration varies over time; and
   a curving tendency estimation unit configured to estimate a curving tendency of at least one of a vehicle roadway and a running state of the vehicle, the curving tendency estimation unit including a filter that extracts the vehicle acceleration differential value from an effective frequency range that corresponds to a detected running state of the vehicle, and the curving tendency estimation unit estimates the curving tendency based on a mean output level of a plurality of the vehicle lateral acceleration differential values calculated by the lateral acceleration differential value calculation section that has passed through the filter.

2. The curving tendency detection device according to claim 1, wherein
   the curving tendency estimation unit is configured to estimate the curving tendency in the vehicle roadway.

3. A curving tendency detection device comprising:
   lateral acceleration differential value calculating means for calculating lateral acceleration differential values of a lateral acceleration acting on a vehicle as the lateral acceleration varies over time; and
   curving tendency estimating means for estimating a curving tendency of at least one of a vehicle roadway and a running state of the vehicle by using filtering means for extracting the vehicle acceleration differential values from an effective frequency range that corresponds to a detected running state of the vehicle, with the curving tendency estimation means estimating the curving tendency based on a mean output level of a plurality of the lateral acceleration differential value calculated by the lateral acceleration differential value calculating means that has passed through the filter means.

4. A curving tendency detection method comprising:
   calculating a lateral acceleration differential value of a lateral acceleration acting on a vehicle as the lateral acceleration varies over time; and
   estimating a curving tendency of at least one of a vehicle roadway and a running state of the vehicle by using a filter that extracts the vehicle acceleration differential values from an effective frequency range that corresponds to a detected running state of the vehicle, with the curving tendency being estimated based on a mean output level of a plurality of the lateral acceleration differential values that was calculated and that has passed through the filter.

5. The curving tendency detection device according to claim 2, wherein
   the filter includes a time delay element.

6. The curving tendency detection device according to claim 5, wherein
   the filter is further configured to use the effective frequency range that moves to a higher frequency range as vehicle speeds increase.

7. The curving tendency detection device according to claim 2, wherein
   the lateral acceleration differential value calculation section is further configured to reduce a peak of the lateral acceleration differential value with a reduction in vehicle speed.

8. The curving tendency detection device according to claim 1, wherein
   the curving tendency estimation unit section is configured to estimate the running state of the vehicle.

9. A vehicle response control apparatus comprising the curving tendency detection device according to claim 1, wherein
   the vehicle response control apparatus includes a controller configured to control a vehicle state so that an action response of the vehicle in relation to driving operations of a driver increases with an increase in the curving tendency as detected by the curving tendency detection device.

10. The vehicle response control apparatus according to claim 9, wherein
    the controller adjusts a power steer assist mechanism of the vehicle.

11. The curving tendency detection device according to claim 8, wherein
    the filter includes a time delay element.

12. The curving tendency detection device according to claim 8, wherein
    the filter is further configured to use the effective frequency range that moves to a higher frequency range as vehicle speeds increase.

13. The curving tendency detection device according to claim 8, wherein
    the lateral acceleration differential value calculation section is further configured to reduce a peak of the lateral acceleration differential value with a reduction in vehicle speed.

14. The vehicle response control apparatus according to claim 9, wherein
    the controller adjusts a stabilizer rigidity switching mechanism of the vehicle.

15. The vehicle response control apparatus according to claim 9, wherein
    the controller adjusts a damping force adjustment orifice of a shock absorber of the vehicle.

* * * * *